US012792452B2

(12) United States Patent
Jeong et al.

(10) Patent No.: US 12,792,452 B2
(45) Date of Patent: Nov. 10, 2026

(54) APPARATUS FOR ERROR RECOVERY AND METHOD OF OPERATING THE SAME

(71) Applicant: SAMSUNG ELECTRONICS CO., LTD., Suwon-si (KR)

(72) Inventors: Jong Heon Jeong, Suwon-si (KR); Kangrak Kwon, Suwon-si (KR); Youngkyu Park, Suwon-si (KR); Hyunseok Seo, Suwon-si (KR); Kyungmin Lee, Suwon-si (KR); Dongwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 18/617,082

(22) Filed: Mar. 26, 2024

(65) Prior Publication Data

US 2025/0045149 A1 Feb. 6, 2025

(30) Foreign Application Priority Data

Jul. 31, 2023 (KR) ........................ 10-2023-0099942

(51) Int. Cl.
*G06F 11/07* (2006.01)

(52) U.S. Cl.
CPC ................................ *G06F 11/0793* (2013.01)

(58) Field of Classification Search
CPC ............. G06F 11/0793; G06F 11/0757; G06F 11/1004
See application file for complete search history.

(56) References Cited

U.S. PATENT DOCUMENTS

| | | | | |
|---|---|---|---|---|
| 9,552,253 B2 | 1/2017 | Iyer et al. | | |
| 10,146,733 B2 | 12/2018 | Iyer et al. | | |
| 10,880,137 B2 | 12/2020 | Das Sharma | | |
| 11,080,212 B2 | 8/2021 | Iyer et al. | | |
| 11,467,909 B1 * | 10/2022 | Jeon | .................... | G06F 13/4221 |
| 11,474,960 B2 | 10/2022 | Das Sharma | | |
| 2014/0281753 A1 * | 9/2014 | Wagh | ................. | G06F 11/0745 714/56 |

(Continued)

FOREIGN PATENT DOCUMENTS

CN 114416636 A 4/2022

OTHER PUBLICATIONS

Anonymous, "PCI Express Base Specification Revision 5.0 Version 1.0—Chapter 4", PCI-SIG, May 22, 2019, pp. 245-438, XP093231214.

(Continued)

*Primary Examiner* — Jigar P Patel
(74) *Attorney, Agent, or Firm* — Sughrue Mion, PLLC

(57) ABSTRACT

An apparatus includes a port that is connected to a link including plural lanes to support communication between the apparatus and another device and that transmits a flit in a flit mode, and a processor that controls the link based on a link training and status state machine (LTSSM). The processor transitions from an L0 state to an L0p state, included in the LTSSM, for a portion of the plural lanes based on a receiver error occurring in the portion of the plural lanes and based on the link reaching a specific data rate using equalization bypass, and the port, after transitioning to the L0p state, transmits an ordered set (OS) through the portion of the plural lanes and transmits the flit through remaining lanes of the plural lanes.

20 Claims, 18 Drawing Sheets

(56) References Cited

U.S. PATENT DOCUMENTS

| | | | | |
|---|---|---|---|---|
| 2020/0226084 | A1* | 7/2020 | Das Sharma | G06F 13/362 |
| 2021/0232520 | A1 | 7/2021 | Choudhary et al. | |
| 2022/0004453 | A1* | 1/2022 | Wong | H04L 67/06 |
| 2022/0374319 | A1 | 11/2022 | Jeon et al. | |
| 2024/0111354 | A1* | 4/2024 | Srivastava | G06F 1/3209 |
| 2024/0111700 | A1* | 4/2024 | Srivastava | G06F 13/4265 |

OTHER PUBLICATIONS

Communication dated Dec. 16, 2024, issued by European Patent Office in European Patent Application No. 24187463.5.

* cited by examiner

| Description | Lane | | | |
|---|---|---|---|---|
| | 0 | 1 | 2 | 3 |
| TLP Bytes [0...235] | 0 | 1 | 2 | 3 |
| | 4 | 5 | 6 | 7 |
| | 8 | 9 | 10 | 11 |
| | ⋮ | | | |
| | 224 | 225 | 226 | 227 |
| | 228 | 229 | 230 | 231 |
| | 232 | 233 | 234 | 235 |
| DLP, CRC, ECC Bytes | DLP 0 | DLP 1 | DLP 2 | DLP 3 |
| | DLP 4 | DLP 5 | CRC 0 | CRC 1 |
| | CRC 2 | CRC 3 | CRC 4 | CRC 5 |
| | CRC 6 | CRC 7 | ECC 1 | ECC 2 |
| | ECC 0 | ECC 1 | ECC 2 | ECC 0 |

3-way interleaved

APPARATUS FOR ERROR RECOVERY AND METHOD OF OPERATING THE SAME

CROSS-REFERENCE TO RELATED APPLICATION

This U.S. non-provisional application claims priority under 35 USC § 119 to Korean Patent Application No. 10-2023-0099942, filed on Jul. 31, 2023, in the Korean Intellectual Property Office, the disclosure of which is herein incorporated by reference in its entirety.

BACKGROUND

Example embodiments relate to an apparatus for error recovery and a method of operating the same.

A peripheral component interconnect express (PCIe) interface protocol has been used in the computing industry for high-speed data transmission. The PCIe interface protocol provides a bidirectional connection for simultaneously transmitting and receiving data. Up to and including PCIe generation 5.0 (gen 5.0), a synchronization header (sync header) has been used to synchronize timings of blocks, i.e., to synchronize units of data transmitted between lanes. By synchronizing the timings between lanes through the sync header, a receive end that receives serialized data may perform de-serialization without distortion of the data.

Accordingly, in related art standards, a sync header should be transmitted for each block to distinguish boundaries between blocks transmitted and received in PCIe, resulting in performance degradation. In addition, there is a limitation that different packets are unable to be transmitted between lanes.

When a value of the sync header does not match for all lanes, the receive end considers the mismatch an error and transitions to a recovery state. However, even when only a single sync header does not match, all lanes transition to a recovery state, resulting in a period in which performance is significantly degraded.

SUMMARY

It is an aspect to provide an apparatus for error recovery and a method of operating the same.

According to an aspect of one or more example embodiments, there is provided an apparatus comprising a port connected to a link comprising plurality of lanes to support communication between the apparatus and another device and configured to transmit a flit in a flit mode; and a processor configured to control the link based on a link training and status state machine (LTSSM). The processor is configured to transition from an L0 state to an L0p state, included in the LTSSM, for a portion of the plurality of lanes based on a receiver error occurring in the portion of the plurality of lanes and based on the link reaching a specific data rate using equalization bypass, and the port is configured to, after transitioning to the L0p state, transmit an ordered set (OS) through the portion of the plurality of lanes and transmit the flit through remaining lanes of the plurality of lanes.

According to another aspect of one or more example embodiments, there is provided a method comprising transitioning from an L0 state to an L0p state, included in a link training and status state machine (LTSSM), for a portion of a plurality of lanes included in a link based on a receiver error occurring in the portion of the plurality of lanes and based on the link reaching a specific data rate using equalization bypass; and transmitting an ordered set (OS) through the portion of the plurality of lanes and transmitting a flit through remaining lanes of the plurality of lanes.

According to yet another aspect of one or more example embodiments, there is provided a storage device comprising a nonvolatile memory; a port connected to a link comprising a plurality of lanes to support communication between the storage device and another device and configured to transmit a flit in a flit mode; and a controller configured to control the link based on a link training and status state machine (LTSSM). The controller is configured to transition the storage device from an L0 state to an L0p state, included in the LTSSM, for a portion of the plurality of lanes based on a receiver error occurring in the plurality of lanes and based on the link reaching a specific data rate using equalization bypass, and the port is configured to, after transitioning to the L0p state, transmit an ordered set (OS) through the portion of the plurality of lanes and transmit the flit through remaining lanes of the plurality of lanes.

BRIEF DESCRIPTION OF DRAWINGS

The above and other aspects will be more clearly understood from the following detailed description, taken in conjunction with the accompanying drawings, in which.

DETAILED DESCRIPTION

Hereinafter, example embodiments will be described with reference to the accompanying drawings. As used in this specification, the phrase "at least one of A, B and C" includes within its scope "only A", "only B", "only C", "A and B", "B and C", "A and C" and "all of A, B, and C".

Figure 1:
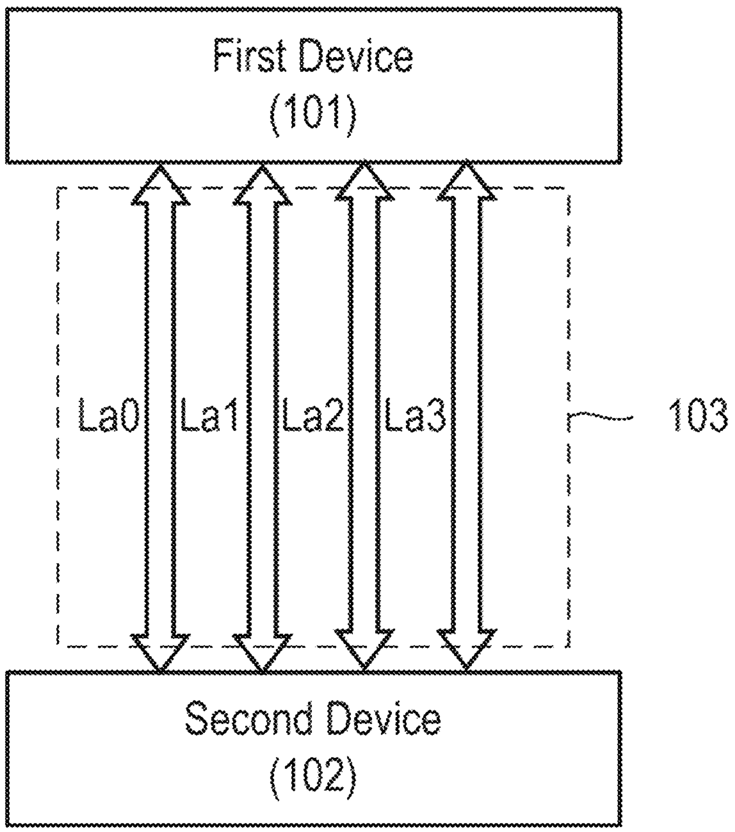
FIG. 1 is a diagram illustrating a peripheral component interconnect express (PCIe) link, according to some example embodiments.

FIG. 1 is a diagram illustrating a peripheral component interconnect express (PCIe) link, according to some example embodiments.

Referring to FIG. 1, PCIe may support operations between two components. The components may transmit and receive packets to and from each other over a link 103. A component may correspond to a physical device transmitting and receiving packets over the link 103. For ease of description, the two components connected over the link 103 may be referred to as a first device 101 and a second device 102, and the phrase "the first and second devices 101 and 102" is used for convenience to describe operations and state transitions that may be performed individually by each of the first device 101 and the second device 102.

The link 103 may correspond to a dual-simplex communication channel connecting ports of the two components. From a logical perspective, a port may be defined as an interface between the two components and the link 103. For example, a first port may be defined between the first device 101 and the link 103, and a second port may be defined between the second device 102 and the link. From a physical perspective, a port may defined as a group of transceivers defining the link 103. Accordingly, objects located on opposite ends of the link 103 may be described as ports and objects located on opposite ends of the link may be described as components including transceivers.

The link 103 may include one or more lanes La0, La1, La2, and La3 between two ports. For example, the link 103 may include one or more lanes La0, La1, La2, and La3 between a first port of the first device 101 and a second port of the second device 102. Each of the lanes La0, La1, La2, and La3 may include two differentially driven signal pairs: a transmit pair and a receive pair. A data clock used in the link 103 may be embedded using an encoding scheme to achieve a significantly high data rate. The link 103 may aggregate the plurality of lanes La0, La1, La2, and La3 to increase a bandwidth. The lanes La0, La1, La2, and La3 included in the link 103 may be expressed as xN (where N is a width of a lane). For example, lanes supported by the PCIe may be x1, x2, x4, x8, and x16. FIG. 1 is illustrated based on the x4 lane, but example embodiments are not limited thereto. During hardware initialization, the link 103 may be set up following a negotiation of lane widths and frequency of operation by the two components (i.e., the first device 101 and the second device 102) on opposite ends of the link 103. Each link 103 may support a symmetrical number of lanes in each direction. For example, the x16 link may have 16 differential signal pairs in each direction.

Figure 2:
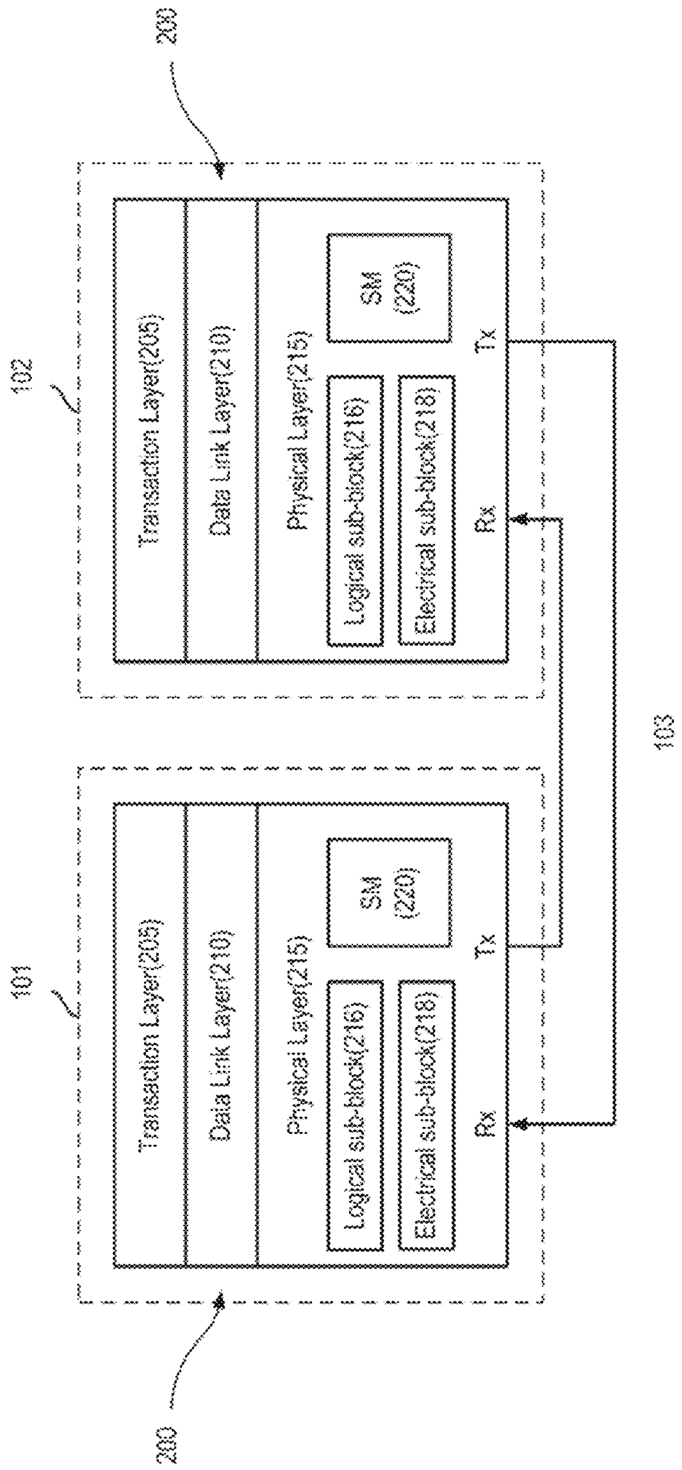
FIG. 2 is a diagram illustrating an example of a layer model, according to some example embodiments.

FIG. 2 is a diagram illustrating an example of a layer model, according to some example embodiments.

Referring to FIG. 2, a layer model 200 may be referred to as a protocol stack. Each of the first device 101 and the second device 102 may have a layer model 200.

The layer model 200 may include a transaction layer 205, a data link layer 210, and a physical layer 215. Each layer includes a first portion that processes transmitted outbound information, and a second portion that processes received inbound information.

Information is transmitted between two components (i.e., the first device 101 and the second device 102) by a packet. The packet may be formed in the transaction layer 205 and the data link layer 210 to transmit information from a transmitting component to a receiving component. When a transport packet passes through another layer, additional information required for the layer to process the packet may be expanded. A reverse process may be performed on a receiving side, and a packet may be transferred to the transaction layer 205 through the physical layer 215 and the data link layer 210.

Transaction Layer 205

The transaction layer 205 is an uppermost layer, and is responsible for assembling and disassembling transaction layer packets (TLPs). The TLPs may be used in communication transactions such as read and write operations, as well as certain types of events. The transaction layer 205 may manage credit-based flow control for the TLPs. All request packets, requiring a response packet, may implemented as split transactions. Each packet may have a unique identifier allowing the response packet to be transmitted to a correct component. Packet formats support different forms of addressing depending on the transaction type (memory, I/O, configuration, and message). The transaction layer 205 may support four address spaces. For example, the four address spaces may include 3 PCI address spaces (memory, I/O, and configuration), and message spaces may be added.

Data Link Layer 210

The data link layer 210 is an intermediate layer, and serves as an intermediate layer between the transaction layer 205 and the physical layer 215. The data link layer 210 is responsible for link management and data integrity, including error detection and error correction. A transmit side of the data link layer 210 may receive the TLPs assembled by the transaction layer 205, calculate and apply a data protection code and a TLP sequence number, and transfer the data protection code and the TLP sequence number to the physical layer 215 for transmission over the link 103. A receive side of the data link layer 210 may verify and transfer integrity of the received TLPs to the transaction layer 205 for additional processing. When an error is detected in the TLPs, the data link layer 210 may request retransmission of the TLPs until it is determined that information has been correctly received or the link 103 has failed. The data link layer 210 may also generate and consume packets used to manage the link 103. The packets of the data link layer 210 may be referred to as data link layer packets (DLP) or data link layer packets (DLLP) to be distinguished from packets used in the transaction layer 205.

Physical Layer 215

The physical layer 215 is a lowermost layer, and may include all circuits for interface operation such as a driver, an input buffer, parallel-to-serial (PS) and serial-to-parallel (SP) conversion, phase-locked loop (PLL), and impedance matching circuits. The physical layer 215 may have logical functions related to interface initialization and maintenance. The physical layer 215 may exchange information in an appropriate format with the data link layer 210. The physical layer 215 may convert information received from the data link layer 210 into a serial format, and may transmit the converted information over the link 103 at a frequency and a width compatible with other components.

The physical layer 215 may include a logical sub-block 216 and an electrical sub-block 218 to physically transmit packets to other devices. The logical sub-block 216 may be responsible for digital functions of the physical layer 215. For example, the logical sub-block 216 may include a transmitting unit that prepares outbound information for transmission by the electrical sub-block 218, and a receiving unit that identifies and prepares information received before transmitting the outbound information to the data link layer 210.

The electrical sub-block 218 may include a transmitter and a receiver. Symbols may be provided to the transmitter through the logical sub-block 216, and the transmitter may serialize and transfer the supplied symbols to another device. The serialized symbols may be provided from another device to the receiver, and the receiver may convert a received signal into a bit-stream. The bit-stream may be de-serialized and provided to the logical sub-block 216.

Each physical layer 215 may include a state machine (SM) 220 for link training. The state machine 220 may be defined as a set of states for exchanging and controlling state information of the PCIe link 103. The state machine 220 enables packet transmission by configuring and initializing the link 103 and ports of components (e.g., the first device 101 and the second device 102) connected through the PCIe. The state machine 220 may have a plurality of states responsible for various link operations, and each of the plurality of states may have sub-states. For example, the state machine 220 may include a link training and status state machine (LTSSM).

FIG. 2 illustrates an example of a PCIe stack. However, example embodiments are not limited thereto. In some example embodiments, the layer model 200 may include, for example, a quick path interconnect (QPI) stack, a next-generation high-performance computing interconnect stack, or various other types of layered protocol stack. For example, the layer model 200 may include a first layer that assembles or disassembles packets, a second layer that stably transmits packets between the first layer and a third layer, and the third layer that transmits and receives packets. The third layer may include a state machine 220.

Figure 3:
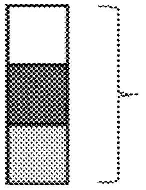
FIG. 3 is a diagram illustrating a flow control unit (flit) mode supported by a logical sub-block of the layer model of FIG. 2 and flits transmitted and received in the flit mode, according to some example embodiments.

FIG. 3 is a diagram illustrating a flow control unit (flit) mode supported by the logical sub-block of the layer model of FIG. 2 and flits transmitted and received in the flit mode, according to some example embodiments.

Referring to FIG. 3, a flit mode may be supported when the link 103 operates at a data rate of 64.0 GT/S or higher, supported in PCIe gen 6.0.

The flit is a data unit supported in flit mode, and may operate based on 1b/1b encoding. The flit may include TLP, DLP, cyclic redundancy checking (CRC), and error correction code (ECC). For example, the flit may have a size of 256 bytes (256B), i.e., 2048 bits. In this case, the flit may include 236B of TLP, 6B of DLP, 8B of CRC, and 6B of ECC. Flits may be interleaved for a plurality of lanes through a byte-alignment scheme. For example, flits maybe interleaved in a 3-way manner. The interleaved flit may include a plurality of ECC symbols (or ECC codewords). The plurality of ECC symbols may belong to a single ECC group, among a plurality of ECC groups. For example, among the plurality of ECC groups, three ECC groups may be interleaved in the 3-way manner. Each of the plurality of ECC symbols may have a size of 8 bits. An ECC code, belonging to each ECC group, may correct an error occurring in each ECC group. When the flit has a size of 256B and is interleaved in the 3-way manner, one of the plurality of ECC groups may include 86B of ECC symbols and the remaining ECC groups may each include 85B of ECC symbols.

As illustrated in FIG. 3, the ECC symbols may be classified into symbols corresponding to TLP, symbols corresponding to DLP, symbols corresponding to CRC, and symbols corresponding to ECC. The symbol corresponding to ECC is a symbol including RS code information in an ECC symbol generated as a result of ECC encoding. In the case of symbols corresponding to CRC, one ECC group may include three symbols and the remaining ECC group may include two symbols.

As described above, until gen 5.0, a flit may determine consistency of data through forward error correction (FEC) using CRC and ECC within a fixed size of 256B without a sync header, i.e., without a criterion for synchronizing timings. For example, in the flit mode, there is no need to additionally transmit a sync header for each block or to compare a value of the sync header for each lane.

Figure 4:
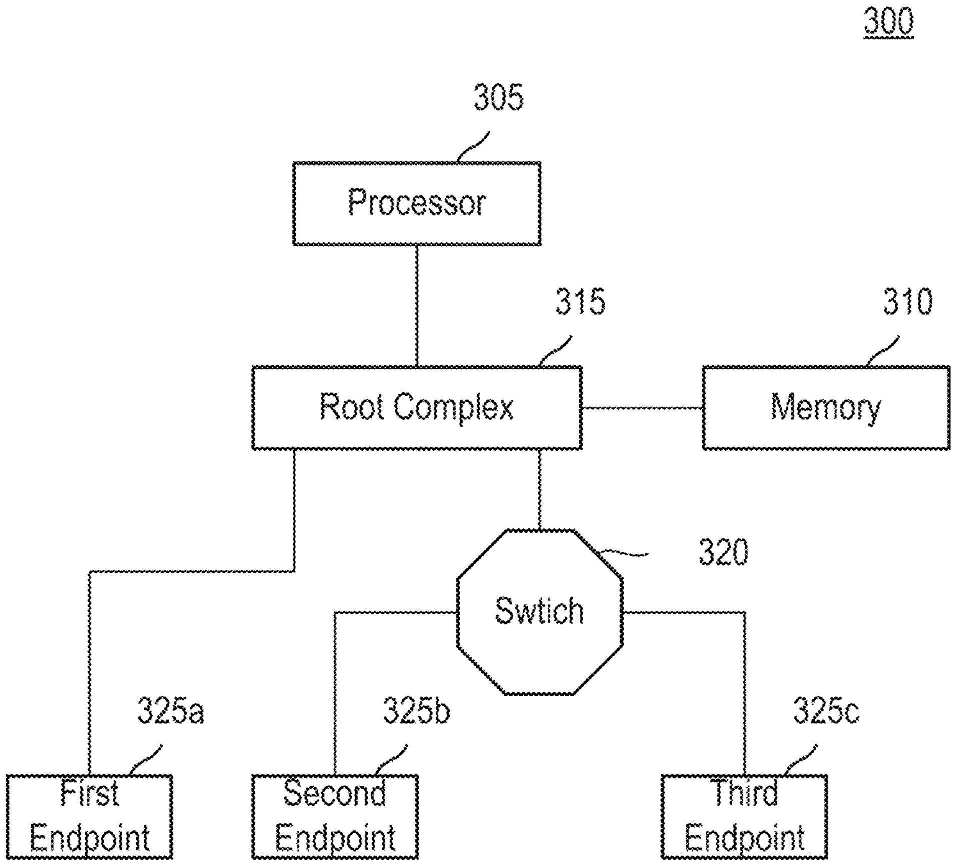
FIG. 4 is a diagram illustrating an electronic system according to an example embodiment.

FIG. 4 is a diagram illustrating an electronic system according to an example embodiment.

Referring to FIG. 4, an electronic system 300 according to an example embodiment may include a processor 305, a memory 310, a root complex 315, a switch 320, and a plurality of endpoints. For example, in some example embodiments, the plurality of endpoints may include a first endpoint 325*a*, a second endpoint 325*b*, and a third endpoint 325*c*. For example, the processor 305, the root complex 315, the switch 320, and the first to third endpoints 325*a* to 325*c* may correspond to the above-described components, respectively. For example, each of the processor 305, the root complex 315, the switch 320, and the first to third endpoints 325*a* to 325*c* may correspond to one of the first device 101 and the second device 102 described above. While FIG. 4 illustrates three endpoints, example embodiments are not limited thereto and, in some example embodiments, the number of endpoints may be less than or greater than three.

The processor 305 may control the overall operation of the electronic system 300. For example, the processor 305 may include at least one of a central processing unit (CPU), a graphics processing unit (GPU), an application processor (AP), or a communication processor (CP). The processor 305 may transmit and receive packets to and from the first to third endpoints 325*a* to 325*c* through the root complex 315 and the switch 320.

For example, the processor 305 may correspond to or be included in a host.

The memory 310 may include any memory device such as a random access memory (RAM), a nonvolatile memory, or other memory devices accessible by devices within the electronic system 300. The memory 310 may be connected to the root complex 315.

The root complex 315 may manage a data flow of components included in the electronic system 300. For example, the root complex 315 may control a data path, schedule data transfer, or resolve communication conflicts. For example, the root complex 315 may support the creation of a configuration request, as a requester.

In some example embodiments, the switch 320 may be connected to the root complex 315. In some example embodiments, the second and third endpoints 325*b* and 325*c* may be connected to the root complex 315 through the switch 320. The switch 320 may control a data path between the root complex 315 and the second and third endpoints 325*b* and 325*c*. In some example embodiments, the first endpoint 325*a* may be connected directly to the root complex 315.

The root complex 315 and the switch 320 may be implemented as various hardware circuits for data control and data transfer.

The first to third endpoints 325*a* to 325*c* may represent a type of function that each of the first to third endpoints 325*a* to 325*c* is, where the type of function may be a requester or completer of a PCIe transaction. For example, as described above, in some example embodiments, a first endpoint 325*a* may be directly connected to the root complex 315. In some example embodiments, the second and third endpoints 325*b* and 325*c* may communicate with the processor 305 through the root complex 315 and the switch 320. For example, the second and third endpoints 325*b* and 325*c* may communicate with each other in a peer-to-peer manner through the switch 320. In this case, the processor 305 may intervene in the processing of data exchanged between the second and third endpoints 325*b* and 325*c*.

For example, in some example embodiments, each of the first to third endpoints 325*a* to 325*c* may be a storage device. In some example embodiments, each of the first to third endpoints 325*a* to 325*c* may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

Data flow in a direction away from the root complex 315 may be defined as downstream, and data flow in a direction closer to the root complex 315 may be defined as upstream. A port transmitting data in a downstream direction may be defined as a downstream port DSP, and a port transmitting data in an upstream direction may be defined as an upstream port USP. For example, a port included in the root complex 315 may be a downstream port. For example, a port included in each of the first to third endpoints 325*a* to 325*c* may be an upstream port.

For example, the switch 320 may transfer packets/messages upstream from a plurality of devices (e.g., the first to third endpoints 325*a* to 325*c*), or may transfer packets/messages downstream from the processor 305.

According to various embodiments, each of the first and second devices 101 and 102 may perform operations for configuring and initializing the link 103 therebetween to operate in a normal state such as L0. For example, each of the processor 305 and the root complex 315 may perform operations for configuring and initialize the link between the processor 305 and the root complex 315 to operate in the normal state such as L0, each of the root complex 315 and the switch 320 may perform operations for configuring and initialize the link between the root complex 315 and the switch 320 to operate in the normal state such as L0, each of the root complex 315 and the memory 310 may perform operations for configuring and initialize the link between the root complex 315 and the memory 310 to operate in the normal state such as L0, and so on. The configuration and initialization may be performed through link training operations of the physical layer. For example, at least one of link width, link data rate, lane reversal, and lane polarity may be set through a link training operation. For example, the link training operations may include at least one of negotiation of link data rate, bit locking per lane, lane polarity, symbol locking per lane, ordering of lanes within the link 103, negotiation of link width, and lane-lane deskew.

Link training may make unrelated lanes of a port into lanes forming the link 103. The first and second devices 101 and 102 may use a training sequence TS to perform a training operation to appropriately set a lane to a desired link 103. The training sequence TS may be defined as a packet that the first and second devices 101 and 102 transmit and receive to each other to share a state of the link 103 of the first and second devices 101 and 102 and to manage information. In an example embodiment, the training sequence TS may include a plurality of symbols, and each of the plurality of symbols may have unique link information. For example, a symbol may correspond to a byte unit. For example, the training sequence may be TS1 and/or TS2 defined in the PCIe standard.

The first and second devices 101 and 102 may perform training operations while transmitting and receiving training sequences to and from each other. The first and second devices 101 and 102 may perform training operations based on a state machine included in the physical layer. Hereinafter, the state machine included in the above-described physical layer (or the third layer) will be described in detail.

Figure 5:
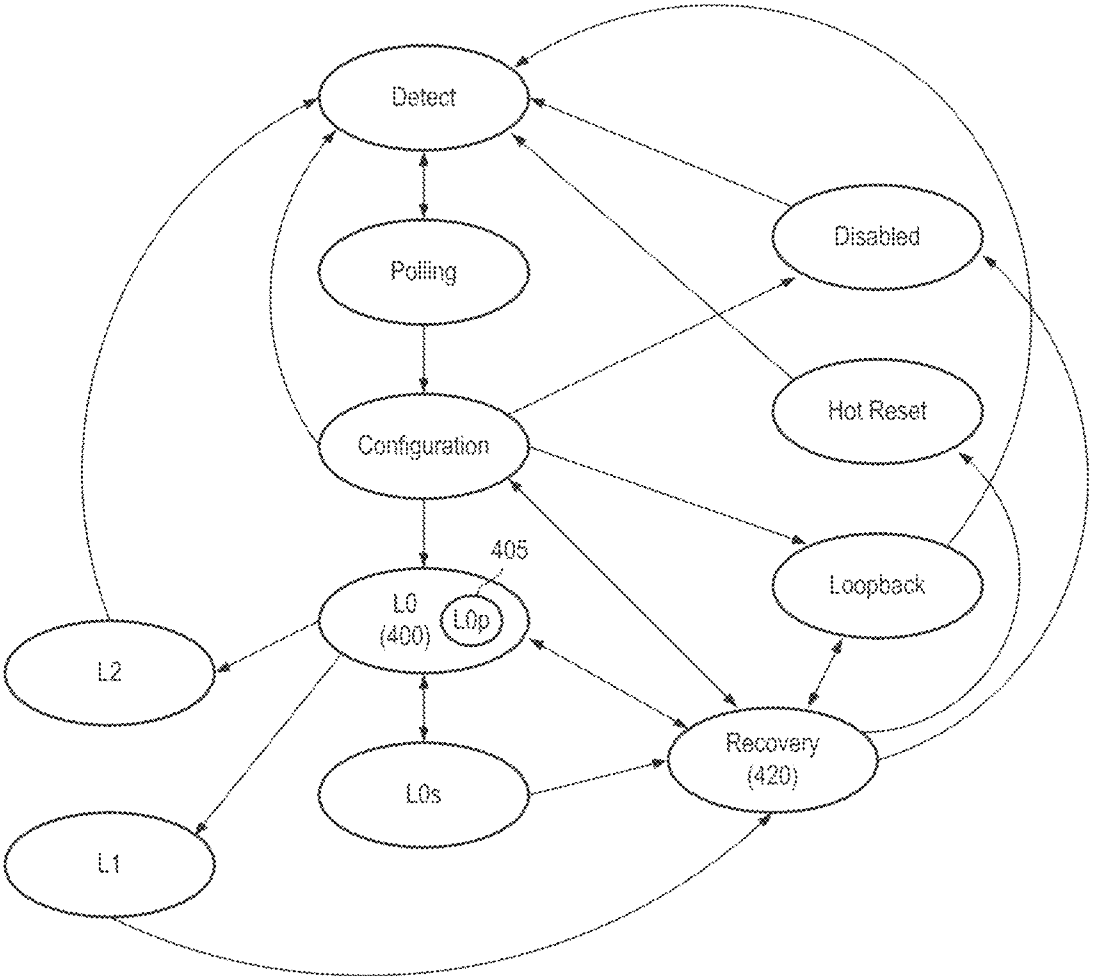
FIG. 5 is a diagram illustrating an example of a state machine, according to an example embodiment.

FIG. 5 is a diagram illustrating an example of a state machine, according to some example embodiments.

Referring to FIG. 5, the state machine may be configured for link training to exchange and control state information of the link 103. The state machine may be, for example, an LTSSM. The LTSSM may include a detection state, a polling state, a configuration state, a recovery state 420, an L0 state 400, an L0s state, an L1 state, an L2 state, a disabled state, a loopback state, and a hot reset state.

The detection state may be a state for detecting whether an end termination connected to the link 103 is present. In the polling state, bit locking and symbol locking may be performed or lane polarity may be configured. The setting state may be a state for managing a configuration of the link 103. In the configuration state, a transmitter and a receiver included in the first and second devices 101 and 102 may transmit and receive data to negotiate a data rate. The recovery state 420 may recover an error in the link 103, or may control a change in data rate.

The L0 state 400 may be a state that a link, which has successfully completed the training sequence, may enter and may be a state in which data and control packets may be transmitted and received. The L0 state 400 may include an L0p state 405. Herein, the L0p state 405 may also be referred to as a Loop state 405.

The L0p state 405 is included in the PCIe gen 6.0 standard and may be defined as a sub-state of L0. The L0p state 405 may provide power saving having short entry latency and long exit latency. The L0p state 405 may be supported in the above-described flit mode of FIG. 3. The L0p state 405 allows a link to have several active lanes without entering the recovery state, and allows the remaining lanes to enter an electrical idle (EI) state. The EI state may be used for power saving and a disabled state, and may be defined as, for example, a normal state in which a transmitter voltage is maintained at the same value in the EI state.

When the L0p state 405 is enabled, all ports may make a request for a change in link width. Due to the change in link width, the number of enabled lanes may be increased (upsize) or decreased (downsize). A link partner may transmit an acknowledgement Ack or a negative acknowledgment Nak in response to a request for the change in link. A port may respond to the request within a specific time after receiving a valid flit with the request. The port may retry or abandon the request for a change in link width when the port does not receive a response within a specific time.

For example, according to an example embodiment, the L0p state 405 may perform a rapid error recovery process without entering the recovery state. The error recovery process of the L0p state 405 will be described in detail later.

The L0s and L1 states may be states for power saving, and the L2 state may be a state for maximum power saving. In the L2 state, most transmitters and receivers may be turned off. The disabled state may cause the configured link 103 to be disabled. The loopback state may be a state for isolating a link 103 of a device and remaining in a test state when a host determines that the device encounters a failure. The hot reset state may be a state for resetting the set link 103.

According to various examples, one of the plurality of states included in the state machine may transition to one or more other states. Except for the state-to-state transition conditions partially mentioned in example embodiments, the remaining state-to-state transition conditions may conform to the PCIe standard.

Figure 6:
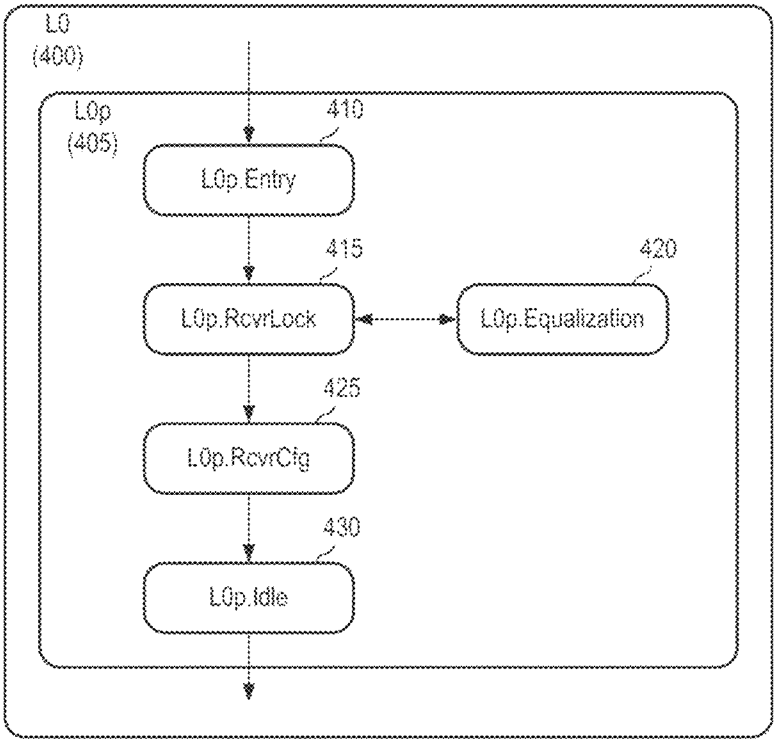
FIG. 6 is a diagram illustrating an L0 state and sub-states of an L0p state, of the state machine illustrated in FIG. 5, according to an example embodiment.

FIG. 6 is a diagram illustrating the L0 state and the L0p state, illustrated in FIG. 5, according to an example embodiment. In the description that follows, the phrase "the first and second devices 101 and 102" is used with respect to certain operations. It will be understood that the first device 101 may perform the certain operations, and the second device 102 may perform the certain operations. In other words, the phrase "the first and second devices 101 and 102" is used for convenience of description and does not necessarily require that the first and second devices together perform the certain operations. For example, as discussed further below, each of the first device 101 and the second device 102 includes a state machine and, in some example embodiments, each of the first device 101 and the second device 102 may transition individually between the various states and sub-states discussed below.

Referring to FIG. 6, the L0 state 400 may include the L0p state 405, as described above. The L0p state 405 may include a first L0p sub-state (L0p.Entry) 410, a second L0p sub-state (L0p.RcvrLock) 415, a third L0p sub-state (L0p.Equalization) 420, a fourth L0p sub-state (L0p.RcvrCfg) 425, and a fifth L0p sub-state (L0p.Idle) 430.

When an error is detected in at least one lane, among lanes operating in the L0 state 400, devices may enter the first L0p sub-state (L0p.Entry) 410 for the at least one error-detected lane and may enter the first L0p sub-state (L0p.Entry) 410 for at least one lane which is configurable with the at least one error-detected lane and may be included in a link width (hereinafter, a lane maintained in the L0 state 400 will be referred to as a normal lane, and a lane entering the first L0p sub-state 410 will be referred to as a recovery lane). For example, referring to FIG. 1, when an error is detected in one lane of the lanes La0, La1, La2, and La3 of the link 103 that are operating in the L0 state 400 between the first device 101 and the second device 102, the first device 101 and the second device 102 may enter the first L0p sub-state (L0p.Entry) 410 for the at least one error detected lane and may enter the first L0p sub-state (L0p.Entry) 410 for one or more other lanes of the one or more lanes La0, La1, La2, and La3 of the link 103 that is configurable with the at least one error-detected lane. The detection of an error may refer to, for example, occurrence of a receiver error or a plurality of receiver errors. For example, when a symbol received from the physical layer 215 is invalid, a receiver error may have occurred. For example, a receiver error may be caused by a non-response from a device at a receive side to a flit transferred by a transmit side (for example, the receive side does not transfer a training sequence to the transmit side in response to the flit) or occurrence of a packet error. In some example embodiments, the occurrence of the plurality of receiver errors may denote that a frequency of occurrence of receiver errors exceeds a specific standard.

In the first L0p sub-state (L0p.Entry) 410, the first and second devices 101 and 102 may interrupt transmission of flits for a recovery lane to transmit different types of packets. A sync header does not need to be checked in flit mode, so that the recovery lane may transfer various ordered sets (OS) while a normal lane still transfers a flit in the L0 state 400.

When the transmission of the flit is interrupted, the first and second devices 101 and 102 may transition to the second L0p sub-state (L0p.RcvrLock) 415 for the recovery lane. For example, the first and second devices 101 and 102 may check interruption for the flit transmission to confirm an interruption in the transmission of the flits.

When transitioning from the first L0p sub-state (L0p.Entry) 410 to the second L0p sub-state (L0p.RcvrLock) 415, the first and second devices 101 and 102 may transmit an electrical idle exit ordered set (EIEOS) in the second L0p sub-state (L0p.RcvrLock) 415 and may check block alignment. Here, block alignment may indicate that no error has occurred. For example, EIEOS may be used to determine a start and an end of an OS boundary in a received bit stream. The first and second devices 101 and 102 may confirm that a flit is aligned to start at the end of a first skip (SKP) OS following a start of data stream (SDS) OS, through EIEOS. Each of SDS OS and SKP OS may be an OS defined in the PCIe standard, SDS OS may be an OS for indicating the start of a data stream, and SKP OS may be an OS for correcting a difference in frequencies between opposite ends of a link.

When block alignment is confirmed (i.e., when it is confirmed that there is no error), the first and second devices 101 and 102 may transition to the third L0p sub-state (L0p.Equalization) 420 or the fourth L0p sub-state (L0p.RcvrCfg) 425, depending on whether an equalization history is present.

When no equalization history is present, for example, in the case of a first equalization attempt, the first and second devices 101 and 102 may transition to the third L0p sub-state (L0p.Equalization) 420 for the recovery lane. The first and second devices 101 and 102 may perform equalization in the third L0p sub-state (L0p.Equalization) 420. The equalization may include adjusting a transceiver configuration of each lane to improve signal quality and to satisfy requirements for various parameters related to transmission and reception. The first and second devices 101 and 102 may re-request optimal signal characteristics from each other through the equalization to increase the likelihood of returning to the L0 state 400. For example, according to example embodiments, the first and second devices 101 and 102 enter the third L0p sub-state (L0p.Equalization) 420 to perform equalization on only the recovery lane, and thus the first and second devices 101 and 102 may maintain the L0 state 400 for the normal lane. The first and second devices 101 and 102 may transition back to the second L0p sub-state (L0p.RcvrLock) 415 for the recovery lane when the equalization is normally succeeded.

When transitioning back to the second L0p sub-state (L0p.RcvrLock) 415, the first and second devices 101 and 102 may transmit EIEOS and confirm block alignment and an error. When it is confirmed that the block alignment is normal and an error is not present, the first and second devices 101 and 102 may transition to the fourth L0p sub-state (L0p.RcvrCfg) 425 based on reception of consecutive TS1 or TS2 for the recovery lane. In this case, TS1 or TS2 may have the same link and lane number for all lanes. When a current data rate is 8 GT/s or more, an equalization control (EC) field in TS1 may be 00b. For example, the first and second devices 101 and 102 may transition to the fourth L0p sub-state (L0p.RcvrCfg) 425 after receiving eight consecutive TS1 or TS2.

In some example embodiments, in the case in which an equalization history is present, for example, in the case in which at least one equalization is performed, the first and second devices 101 and 102 may immediately transition to the fourth L0p sub-state (L0p.RcvrCfg) 425 after receiving consecutive TS1 or TS2 in the second L0p sub-state (L0p.RcvrLock) 415 for the recovery lane.

In the fourth L0p sub-state (L0p.RcvrCfg) 425, the first and second devices 101 and 102 may check an operation state for each lane before returning to the L0 state 400. For example, the first and second devices 101 and 102 may check again whether there is no error in operation (i.e., may check the block alignment) in the fourth L0p sub-state (L0p.RcvrCfg) 425. When there is no additional error in the fourth L0p sub-state (L0p.RcvrCfg) 425, the first and second devices 101 and 102 may transition to the fifth L0p sub-state (L0p.Idle) 430 for the recovery lane based on reception of consecutive TS2s. For example, the first and second devices 101 and 102 may receive eight consecutive TS2 and, after the reception of the eight consecutive TS2, may transition to the fifth L0p sub-state (L0p.Idle) 430 when the current data rate is 8 GT/s or more. In this case, TS2 may have the same link and lane number for all lanes.

When the first and second devices 101 and 102 desire to transition to the L0 state 400, the first and second devices 101 and 102 may sequentially transmit the control SKP OS and SDS OS to ultimately start a data stream. Then, the first and second devices 101 and 102 may transmit and receive idle flits for some lanes to transition to the L0 state 400. The idle flit is a flit in which all DLP values are 0, and may be a flit transmitted in advance before transitioning to the L0 state 400. For example, the first and second devices 101 and 102 may transition from the fifth L0p sub-state (L0p.Idle) 430 to the L0 state 400 based on reception of N1 idle flits and transmission of N2 idle flits (where N1 and N2 are positive integers). For example, N1 may be 2, and N2 may be 4 or more. For example, N2 may be 4 or more in an 8b/10b encoding scheme and may be 8 or more in a 1b/1b encoding scheme, but example embodiments are not limited thereto.

Then, the first and second devices 101 and 102 may transmit SKP OS to synchronize operation timings between all lanes, and may transmit a data stream defined as a set of flits starting at the end of SKP OS.

In the above-described embodiments, the first and second devices 101 and 102 may still operate in the L0 state 400 for normal lanes, other than the recovery lane. That is, the first and second devices 101 and 102 may transmit flits for the recovery lane while operating in the L0 state 400 for the normal lane.

According to the above-described embodiments, when an error occurs in a portion of lanes of a link, the first and second devices 101 and 102 may attempt error recovery for the portion of the lanes without entering the recovery state for all lanes. In other words, when the error occurs in a portion of the lanes of the link, the first and second devices 101 and 102 may attempt error recovery for only the portion of the lanes without entering the recovery state for all lanes. The first and second devices 101 and 102 may transmit a flit in the recovery lane in which error recovery should be attempted when an error occurs while being still maintaining the L0 state 400 in the remaining normal lanes, other than the recovery lane. Therefore, the first and second devices 101 and 102 may perform equalization within a single link to improve data communication based on the L0 state 400 and signal integrity (SI). As a result, the first and second devices 101 and 102 may have advantages of securing continuity of data communication, preventing speed reduction caused by recovery entry of all existing lanes, and improving flexibility of link operation as compared to the related art.

Figure 7:
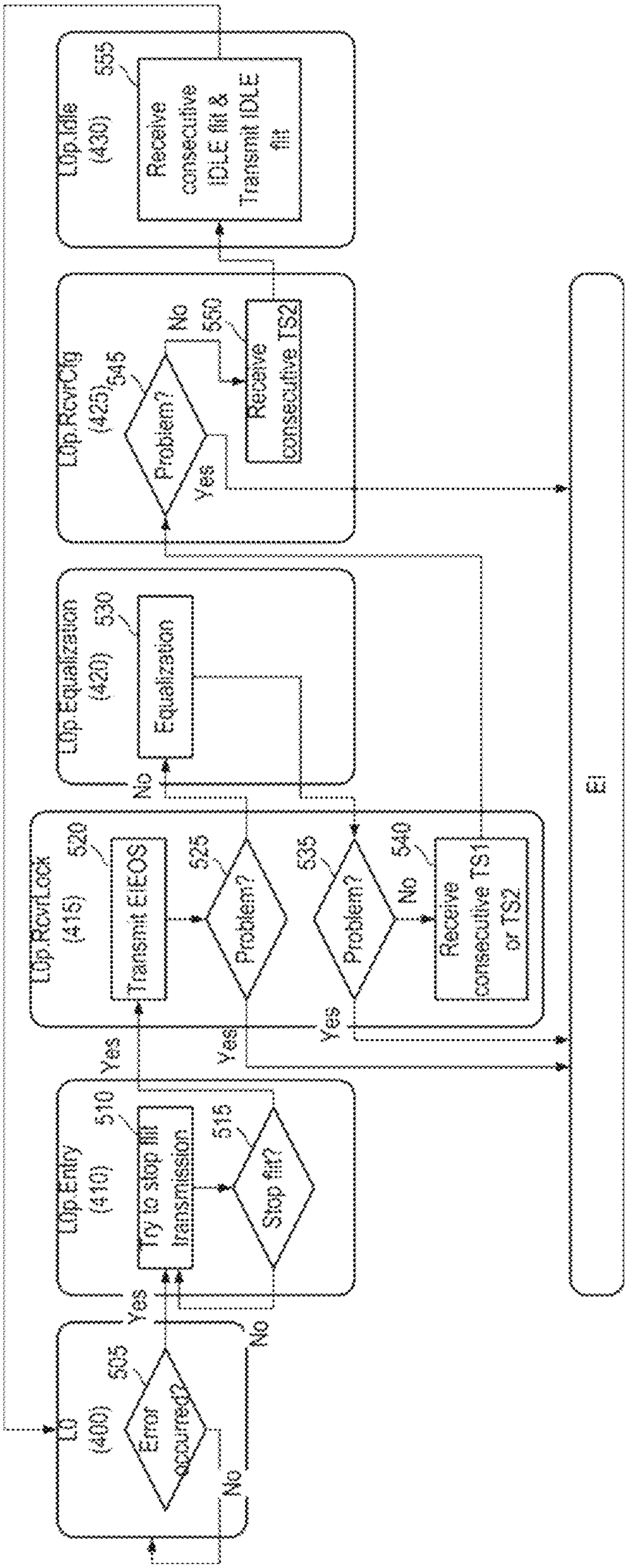
FIG. 7 is a diagram illustrating a relationship between the sub-states of the L0p state of FIG. 6, according to an example embodiment.

FIG. 7 is a diagram illustrating a relationship between the L0p sub-states of FIG. 6, according to some example embodiments.

Referring to FIG. 7, first and second devices 101 and 102 according to an example embodiment may determine whether an error has occurred in an operating lane, while normally transmitting a flit in the L0 state 400 (operation 505). When transmission of a data stream is determined to impossible due to occurrence of an error or a plurality of errors in at least one lane during an operation in the L0 state 400 (operation 505, Yes), the first and second devices 101 and 102 are unable to be maintained in the L0 state 400 and should transition to another state.

For example, the error may be the above-described receiver error when viewed from the physical layer 215. For example, the type of errors may include a framing error defined in the PCIe standard, a loss of block alignment, an overflow/underflow of an elastic buffer, a loss of lane-to-lane de-skew, or the like.

When a receiver error occurs in a portion of the lanes (e.g., one or more of the lanes), the first and second devices 101 and 102 may transition from the L0 state 400 to the recovery state or the L0p state 405.

In an example embodiment, when a receiver error occurs in a portion of the lanes, the first and second devices 101 and 102 may transition to the recovery state or the L0p state 405 depending on what equalization mechanism is used, such that a link reaches a current data rate. For example, the first and second devices 101 and 102 may transition from the L0 state 400 to the recovery state based on reaching the current data rate based on a full equalization mechanism. In this case, the first and second devices 101 and 102 may transition to the recovery state for all lanes.

In some example embodiments, the first and second devices 101 and 102 may transition from the L0 state 400 to the L0p state 405 for the recovery lane based on reaching the current data rate using equalization bypass. The equalization bypass may be defined as a mechanism to skip equalization for a plurality of data rates lower than a specific data rate, and will be described in detail later.

According to an example embodiment, when the first and second devices 101 and 102 desire to transition to an L0p state 405, the first and second devices 101 and 102 may first transition to the first L0p sub-state 410 for the recovery lane. The first and second devices 101 and 102 may maintain the L0 state 400 for normal lanes other than the recovery lane. Accordingly, some lanes may be maintained in the L0 state 400, so that continuity of data communication may be continuously secured.

After transitioning to the L0p state 405 for the recovery lane, the first and second devices 101 and 102 may transmit various OS through the recovery lane and may still transmit flits through the normal lane in the L0 state 400.

When an error is not detected (operation 505, No), the first and second devices 101 and 102 may maintain the L0 state 400 for all lanes.

The L0p sub-state illustrated in FIG. 7 may be understood as being described with respect to the recovery lane.

For the recovery lane that has transitioned to the first L0p sub-state 410, the first and second devices 101 and 102 may try to interrupt transmission of the flit (operation 510). In some example embodiments, the first and second devices 101 and 102 may try to stop transmission of the flit.

The first and second devices 101 and 102 may determine whether the transmission of the flit for the recovery lane has stopped (operation 515). When the first and second devices 101 and 102 determine that transmission of the flit has been interrupted (operation 515, Yes), the first and second devices 101 and 102 may transition to the second L0p sub-state 415 for the recovery lane. When the first and second devices 101 and 102 determine that transmission of the flit has not been interrupted (operation 515, No), the first and second devices 101 and 102 may maintain the first L0p sub-state 410 until the transmission of the flit is interrupted. In some example embodiments, when the transmission of the flit is not interrupted, the first and second devices 101 and 102 may transmit EIEOS for the recovery lane and enter an EI state.

After transitioning to a second L0p sub-state 415, the first and second devices 101 and 102 may transmit EIEOS for the recovery lane (operation 520). For example, the first and second devices 101 and 102 may transmit TS1 and transmit EIEOS.

The first and second devices 101 and 102 may determine whether there is a problem (operation 525). For example, the first and second devices 101 and 102 may determine a start and an end of a boundary of the OS in a bit stream received through EIEOS and confirm block alignment and an error. When it is determined that there is no problem (operation 525, No), the first and second devices 101 and 102 may transition to the third L0p sub-state 420 for the recovery lane. For example, when it is confirmed that block alignment is normal and an error is not present, the first and second devices 101 and 102 may transition to the third L0p sub-state 420 for the recovery lane. In some example embodiments, when it is determined that there is a problem (e.g., when block alignment is not confirmed to be normal (i.e., an unaligned state) or an error is confirmed) (operation 525, Yes), the first and second devices 101 and 102 may transmit EIOS for the recovery lane and enter the EI state.

After transitioning to the third L0p sub-state 420, the first and second devices 101 and 102 may perform equalization (operation 530). In an example embodiment, the first and second devices 101 and 102 may train the link at 2.5 GT/s, and may then immediately change to 32 GT/s, which is a rate supported in PCIe gen 5.0, and perform equalization at 32 GT/s. For example, the first and second devices 101 and 102 may bypass a data rate used in PCIe generations prior to the PCIe gen 5.0.

In an example embodiment, in the third L0p sub-state 420, the first and second devices 101 and 102 may transition from the third L0p sub-state 420 to the second L0p sub-state 415 for the recovery lane but maintain a data rate in the case of a timeout in which a transition to another state occurs after a specific time has passed. Then, the first and second devices 101 and 102 may transmit EIOS for the recovery lane and enter the EI state. In this case, even when the first and second devices 101 and 102 enter the second L0p sub-state 415 after the timeout occurs, equalization performance history may be considered to be present. For example, a variable start_equalization_w_preset, indicating an equalization performance history, may be set to 1b.

During the entire L0p state 405, a variable perform_equalization_for_loopback_64 GT (a variable indicating equalization associated with the loopback state) used in the recovery state may be set to and/or maintained at 0b. For example, equalization in the L0p state 405 may be distinguished from equalization performed in the recovery state.

The first and second devices 101 and 102 may transition back to the second L0p sub-state 415 for the recovery lane when the equalization is successfully completed in operation 530.

After transitioning from the third L0p sub-state 420 back to the second L0p sub-state 415, the first and second devices 101 and 102 may transmit EIEOS in the second L0p sub-state 415 and may determine whether there is a problem (operation 535). For example, the first and second devices 101 and 102 may confirm a block alignment and an error. When there is no problem (e.g., when block alignment is confirmed to be normal and an error is not present) (operation 535, No), the first and second devices 101 and 102 may receive consecutive TS1 or TS2 for the recovery lane (operation 540) and may transition to the fourth L0p sub-state 425 after receiving the consecutive TS1 or TS2 for the recovery lane.

In some example embodiments, when it is determined that there is a problem (e.g., when block alignment is not confirmed to be normal or an error is confirmed) (operation 535, Yes), the first and second devices 101 and 102 may transmit EIEOS to the recovery lane and enter the EI state.

After transitioning to a fourth L0p sub-state 425, the first and second devices 101 and 102 may transmit EIEOS and determine whether there is a problem (operation 545). For example, the first and second devices 101 and 102 may confirm block alignment and an error. For example, the first and second devices 101 and 102 may check an operating state for each lane before returning to the L0 state 400 from the fourth L0p sub-state 425. When there is no problem (e.g., when block alignment is normal and an error is not present) (operation 545, No), the first and second devices 101 and 102 may receive consecutive TS2 for the recovery lane (operation 550) and transition to the fifth L0p sub-state 430 after receiving consecutive TS2 for the recovery lane.

In some example embodiments, when it is determined that there is a problem (e.g., when block alignment is not confirmed to be normal (i.e., an unaligned state) or an error is confirmed) (operation 545, Yes), the first and second devices 101 and 102 may transmit EIOS for the recovery lane and enter the EI state.

After transitioning to the fifth L0p sub-state 430, the first and second devices 101 and 102 may receive consecutive IDLE flits and transmit IDLE flits (operation 555) and may transition to the L0 state 400. For example, the first and second devices 101 and 102 may sequentially transmit the control SKP OS and SDS OS to start a data stream before transitioning to the L0 state 400. Then, the first and second devices 101 and 102 may transition to the L0 state 400 based on reception of N1 idle flits and transmission of N2 idle flits for the recovery lane.

According to the above-described embodiments, even when an error occurs, all lanes do not enter the recovery state. Rather, only the recovery lane transitions to the L0p state 405, and a normal lane is maintained in the L0 state 400. Thus, data communication may be maintained even in some lanes.

In some example embodiments, when an error is maintained as a result of performing equalization, the first and second devices 101 and 102 do not decrease a speed of the recovery lane but transition the recovery lane to the EI state. For example, the first and second devices 101 and 102 may disable the recovery lane to prevent speeds of all lanes from decreasing, unlike existing related art recovery state.

When equalization is performed based on the above-described equalization bypass, if equalization fails, a returned data rate may be a data rate before a bypassed data rate. For example, if equalization fails at 64 GT/s, a data rate may decrease through 32 GT/s to 2.5 GT/s. However, according to example embodiment, the normal lane continues to be maintained in the L0 state 400 and the recovery lane transitions to the EI state, so that even the normal lane may operate at a high data rate (for example, 64 GT/s). That is, in some example embodiments, the normal lane continues to be maintained in the L0 state 400 and only the recovery lane transitions to the EI state, so that the normal lane may operate at the high data rate (for example, 64 GT/s).

Figure 8:
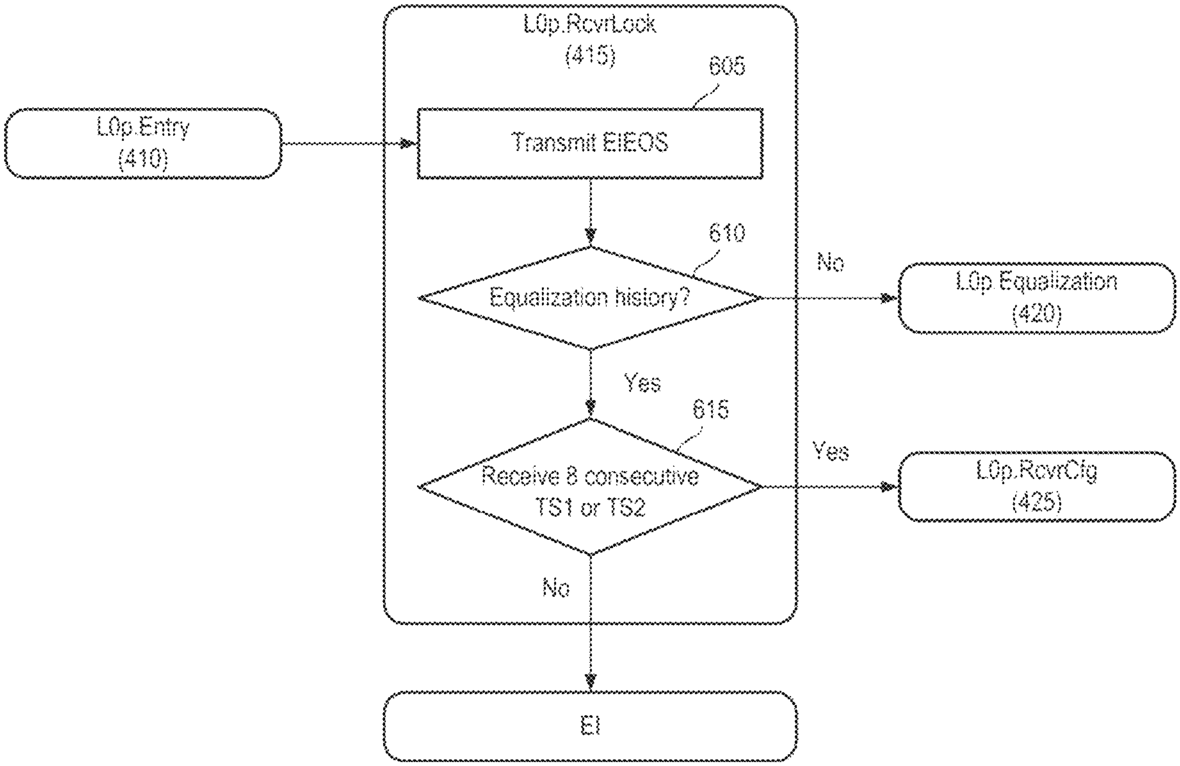
FIG. 8 is a diagram illustrating an operation of a second L0p sub-state according to an example embodiment.

FIG. 8 is a diagram illustrating an operation of the second L0p sub-state according to an example embodiment.

Referring to FIG. 8, according to an example embodiment, the first and second devices 101 and 102 may transmit EIEOS (operation 605) and may confirm block alignment after transitioning from a first L0p sub-state 410 to a second L0p sub-state 415.

After the block alignment is confirmed, the first and second devices 101 and 102 may check whether equalization history is present (operation 610). When the equalization history is not present (operation 610, No), the first and second devices 101 and 102 may transition to the third L0p sub-state 420 for the recovery lane. For example, that the equalization history is not present may indicate that the first and second devices 101 and 102 desire to perform equalization first after entering the L0p state 405. When the equalization history is present (operation 610, Yes), it may be determined whether the first and second devices 101 and 102 receive eight consecutive TS1 or TS2 over the recovery lane (operation 615).

After receiving the eight consecutive TS1 or TS2 (operation 615, Yes), the first and second devices 101 and 102 may transition to a fourth L0p sub-state 425 for a lane, in which the consecutive TS1 or TS2 has been received, among recovery lanes. However, when there is a lane in which the eight consecutive TS1 or TS2 have not been received (operation 615, No), the first and second devices 101 and 102 may transition to the EI state for the lane in which the eight consecutive TS1 or Ts2 have not been received. For example, the first and second devices 101 and 102 may determine a lane that has not received consecutive TS1 or TS2, as an inoperable lane and may transition to an EI state for the inoperable lane and transition to a fourth L0p sub-state 425 for the remaining lanes.

Figure 9:
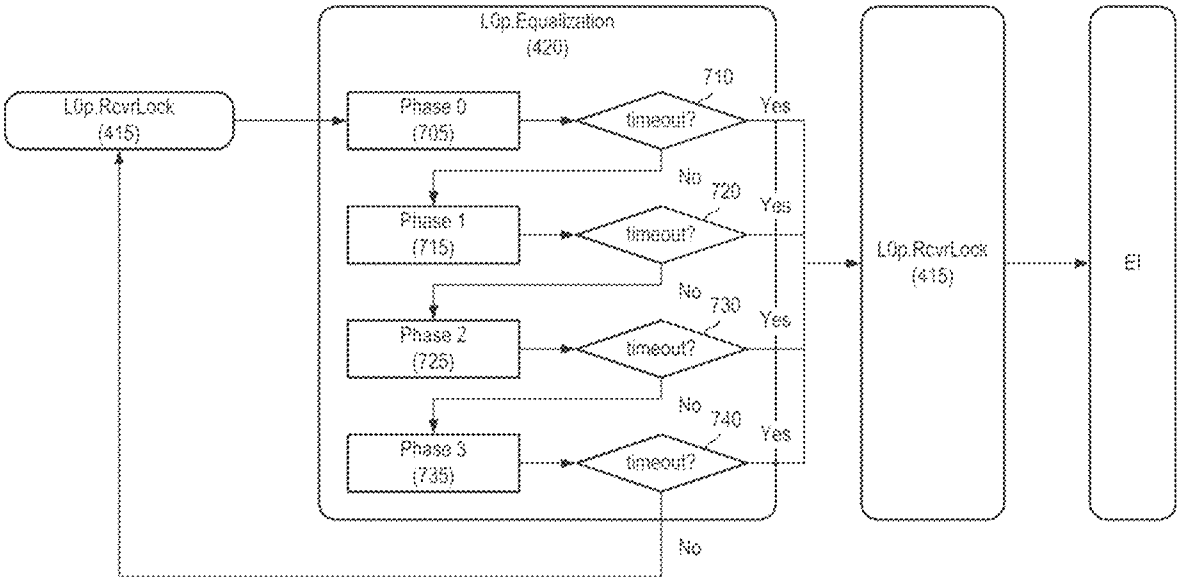
FIG. 9 is a diagram illustrating an operation of a third L0p sub-state according to an example embodiment.

FIG. 9 is a diagram illustrating an operation of the third L0p sub-state according to an example embodiment.

Referring to FIG. 9, according to an example embodiment, the first and second devices 101 and 102 may perform equalization during a phase 0 (705), a phase 1 (715), a phase 2 (725), and a phase 3 (735) after transiting from the second L0p sub-state 415 to the third L0p sub-state 420. A reference value for timeout may be set in each phase. The reference value may be set depending on the type of port (for example, DSP or USP), and a specific value may conform to the PCIe standard.

The first and second devices 101 and 102 may exchange preset values required for equalization during or prior to negotiation of a data rate at which equalization is to be performed in the phase 0 (705). In the phase 0 (705), TS2 may be transmitted. It may be determined whether a timeout occurs (710). In an example embodiment, when a timeout occurs (710, Yes) for the reference value set during the phase 0 (705), the first and second devices 101 and 102 may return to the second L0p sub-state 415 and then immediately transition to the EI state. When the timeout does not occur (710, No) for the reference value set during the phase 0 (705), the first and second devices 101 and 102 may transition to phase 1 (715).

The first and second devices 101 and 102 may exchange TS1 (or TS0) to establish an operable link in the phase 1 (715). It may be determined whether a timeout occurs (720). In an example embodiment, when a timeout occurs (720, Yes) for a reference value set during the phase 1 (715), the first and second devices 101 and 102 may return to the second L0p sub-state 415 and then immediately transition to the EI state. When the timeout does not occur (720, No) for the reference value set during the phase 1 (715), the first and second devices 101 and 102 may transition to phase 2 (725).

In the phase 2 (725), a device corresponding to the USP may transmit a request for setting a transmitter coefficient/preset, satisfying electrical requirements of the link, to a device corresponding to the DSP, and the devices may exchange TS1 (or TS0) with each other. It may be determined whether a timeout occurs (730). In an example embodiment, when a timeout occurs (730, Yes) for a reference value set during the phase 2 (725), the first and second devices 101 and 102 may return to the second L0p sub-state (415) and then immediately transition to the EI state. When the timeout does not occur (730, No) for the reference value set during the phase 2 (725), the first and second devices 101 and 102 may transition to phase 3 (735).

In the phase 3 (735), the device corresponding to the DSP may transmit a request for setting a transmitter coefficient/preset, satisfying electrical requirements of a link, to a device corresponding to the USP, and the devices may exchange TS1 (or TS0) with each other. It may be determined whether a timeout occurs (740). In an example embodiment, when a timeout occurs (740, Yes) for a reference value set during the phase 3 (735), the first and second devices 101 and 102 may return to the second L0p sub-state 415 and then immediately transition to the EI state. When the timeout does not occur (740, No) for the reference value set during the phase 3 (735), the first and second devices 101 and 102 may return to the second L0p sub-state 415.

The operation performed in each phase may conform to the PCIe standard.

Figure 10:
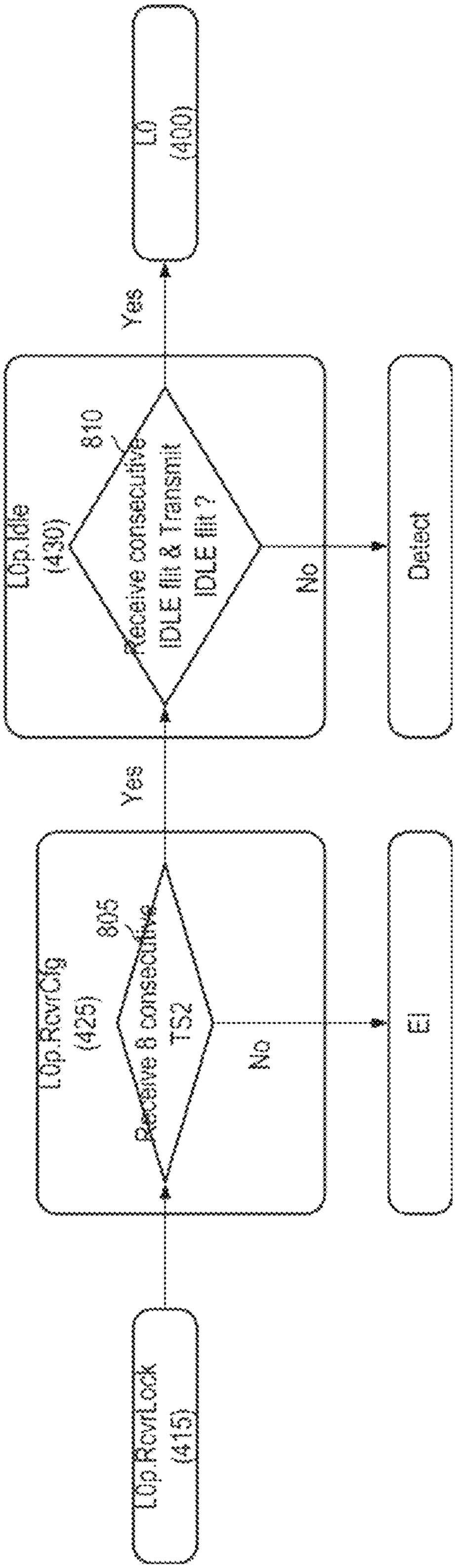
FIG. 10 is a diagram illustrating an operation of a fourth L0p sub-state and the fifth L0p sub-state according to example embodiments.

FIG. 10 is a diagram illustrating operations of the fourth L0p sub-state and the fifth L0p sub-state according to an example embodiment.

Referring to FIG. 10, according to an example embodiment, after transitioning from the second L0p sub-state 415 to the fourth L0p sub-state 425, the first and second devices 101 and 102 may determine whether eight consecutive TS2 have been received through a recovery lane (805).

When the eight consecutive TS2 have been received (805, Yes), the first and second devices 101 and 102 may transition to the fifth L0p sub-state 430 for the lane in which the consecutive TS1s have been received, among recovery lanes. However, when there is a lane in which the eight consecutive TS2 have not been received (805, No), the first and second devices 101 and 102 may transition to the EI state for the lane in which the eight consecutive TS2 have not been received.

The devices 101 and 102 may determine whether two consecutive idle flits have been received for the recovery lane which have transitioned from the fourth L0p sub-state 425 to the fifth L0p sub-state 430, and whether a specific number of idle flits have been transmitted for the recovery lane (810). For example, the number of transmit idle flits may be set based on the encoding method, as described above.

When two consecutive idle flits have been received and the specific number of idle flits have been transmitted (810, Yes), the first and second devices 101 and 102 may transition to the L0 state 400. However, when the two consecutive idle flits have not been received and/or the specific number of idle flits have not been transmitted (810, No), the first and second devices 101 and 102 may return to a detection state and retrain the link from the beginning.

Figure 11:
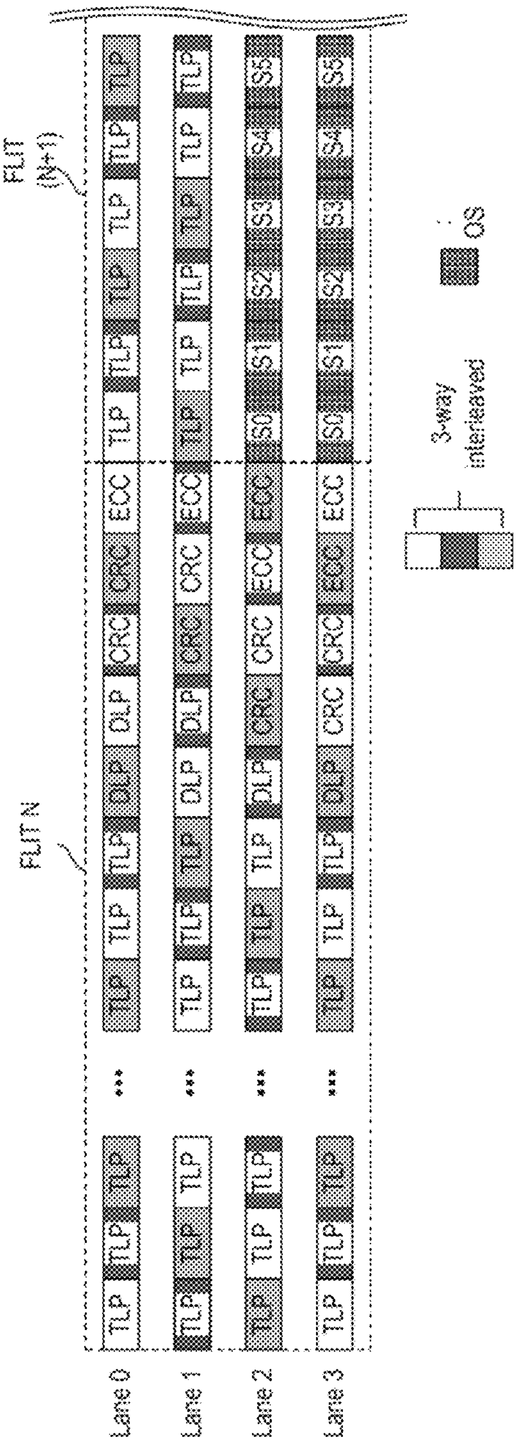
FIG. 11 is a diagram illustrating a data stream transmitted for each lane according to an example embodiment.

FIG. 11 is a diagram illustrating a data stream transmitted for each lane according to an example embodiment.

Referring to FIG. 11, in an example embodiment, when an x4 lane is set and operates in flit mode, the first to fourth lanes (Lane 0 to Lane 3 of FIG. 11) may each transmit a 3-way interleaved N-th flit in an L0 state 400 (where N is a positive integer). For example, the first to fourth lanes may transmit TLP of 236B, DLP of 6B, CRC of 8B, and ECC of 8B, as described above. Data streams including TLP, DLP, CRC, and ECC may be transmitted in units of unit interval (UI) and symbols. A single symbol may have a size of 8 bits. For example, a single symbol may be modulated based on a pulse amplitude modulation-4 (PAM-4) scheme in the flit mode.

According to the above-described embodiments, when an error is detected in some lanes, except for a recovery lane transitioning an L0p state (405) based on error detection, the remaining normal lanes may still operate in the L0 state 400.

For example, when an error occurs in the third or fourth lane, the first and second devices 101 and 102 may operate at, in detail, x2 that is a largest width among lane widths supported below x4. Accordingly, the third and fourth lanes may operate as recovery lanes, and the first and second lanes may operate as normal lanes, as illustrated in FIG. 11, Then, the first lane and the second lane may still sequentially transmit an N+1-th flit following the N-th flit, and the third lane and the fourth lane may sequentially transmit various OS in flits following the N-th flit in L0p sub-states according to the above-described embodiments. For example, according to example embodiments, the third and fourth lanes may transmit an OS to try a recovery process, rather than be disabled as in the existing L0p.

Figure 12:
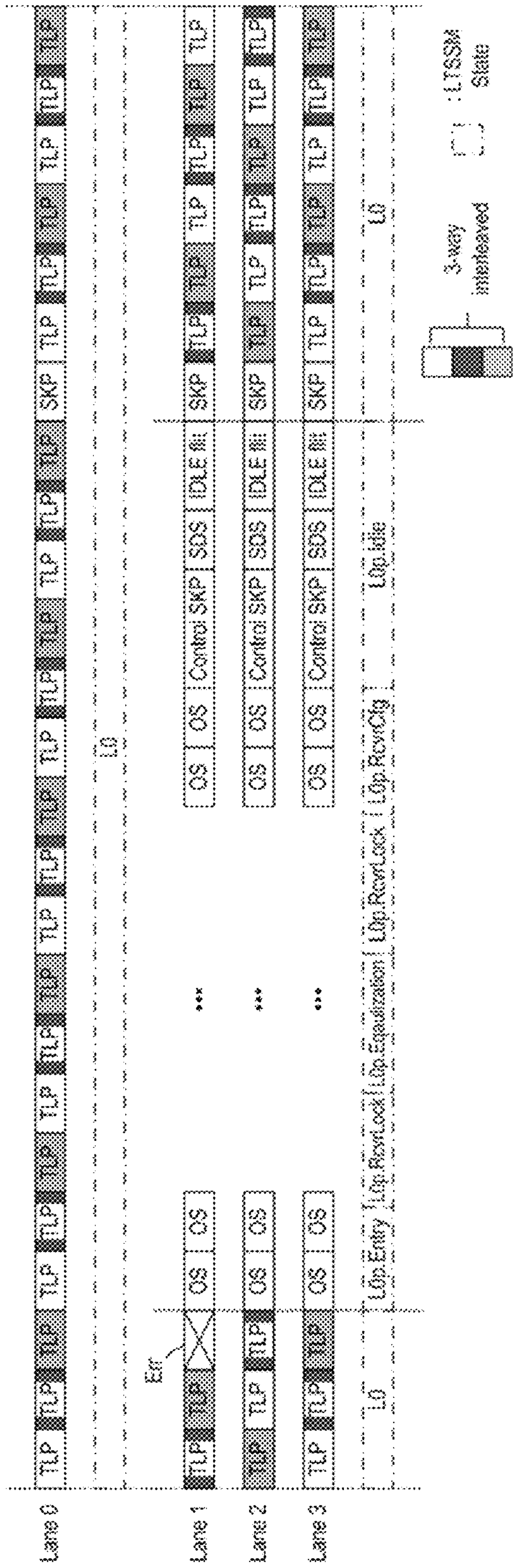
FIG. 12 is a diagram illustrating a data stream transmitted for each lane and a link training and status state machine (LTSSM) according to an example embodiment.

FIG. 12 is a diagram illustrating a data stream transmitted for each lane and LTSSM according to an embodiment.

Referring to FIG. 12, in an example embodiment, when an x4 lane is set and operates in flit mode, an example may be provided in which, while each of the first to fourth lanes (Lane 0 to Lane 3) is transmitting a 3-way interleaved flit in the L0 state 400, an error Err or a plurality of errors are detected in a second lane (e.g., Lane 1).

Since the error Err was detected in the second lane (Lane 1), it may be difficult for the first and second devices 101 and 102 to operate at a x2 lane width including the first and second lanes (Lane 0 and Lane 1). Accordingly, the first and second devices 101 and 102 may continue to transmit flits while the first lane, which is still operable, is maintained in an L0 state 400, and may transition to a first L0p sub-state 410 for the remaining second to fourth lanes. For example, the first and second devices 101 and 102 may operate at a lane width of x1.

The first and second devices 101 and 102 may transmit OS, required in each L0p sub-state, while transitioning to one of the first L0p sub-state 410 to the fourth L0p sub-states 425 according to the above-described embodiments for recovery lanes, for example, for the second to fourth lanes.

For example, the first and second devices 101 and 102 may interrupt transmission of flits for the second to fourth lanes after transitioning to the first L0p sub-state 410, and may transition to the second L0p sub-state 415 after the interruption of transmission is confirmed. The first and second devices 101 and 102 may transition to the third L0p sub-state 420 after block alignment is confirmed in the second L0p sub-state 415 and equalization history is not present. The first and second devices 101 and 102 may perform equalization and return back to the second L0p sub-state 415. The first and second devices 101 and 102 may transition to the fourth L0p sub-state 425 after block alignment is confirmed in the second L0p sub-state 415 and a specific number of training sequences (for example, TS1 or TS2) are consecutively received. The first and second devices 101 and 102 may transition to the fifth L0p sub-state 430 after continuously receiving a specific number of training sequences (for example, TS2) in the fourth L0p sub-state 425.

The first and second devices 101 and 102 may sequentially transmit control SKP and SDS in the second lane to the fourth lane before transitioning to the L0 state 400 after transitioning to the fifth L0p sub-state 430. Then, the first and second devices 101 and 102 may transmit and receive idle flits and transition to the L0 state 400. In the L0 state 400, the first and second devices 101 and 102 may transmit SKP in response to a time point, at which the first lane transmits SKP, to synchronize an operation timing with the first lane. Then, the second to fourth lanes may return to the L0 state 400, and the link may again have a lane width of x4. Accordingly, all lanes may normally transmit flits in the L0 state (400).

According to the above-described embodiments, when the error Err occurs in some lanes, the first and second devices 101 and 102 may try recovery by transitioning only a recovery-required lane to the L0p state 405 rather than transitioning all lanes to a recovery state. Accordingly, a maintainable lane may still transmit a flit in the L0 state 400 to prevent a timeout which may otherwise occur in a case in which communication of all lanes is interrupted.

Figure 13:
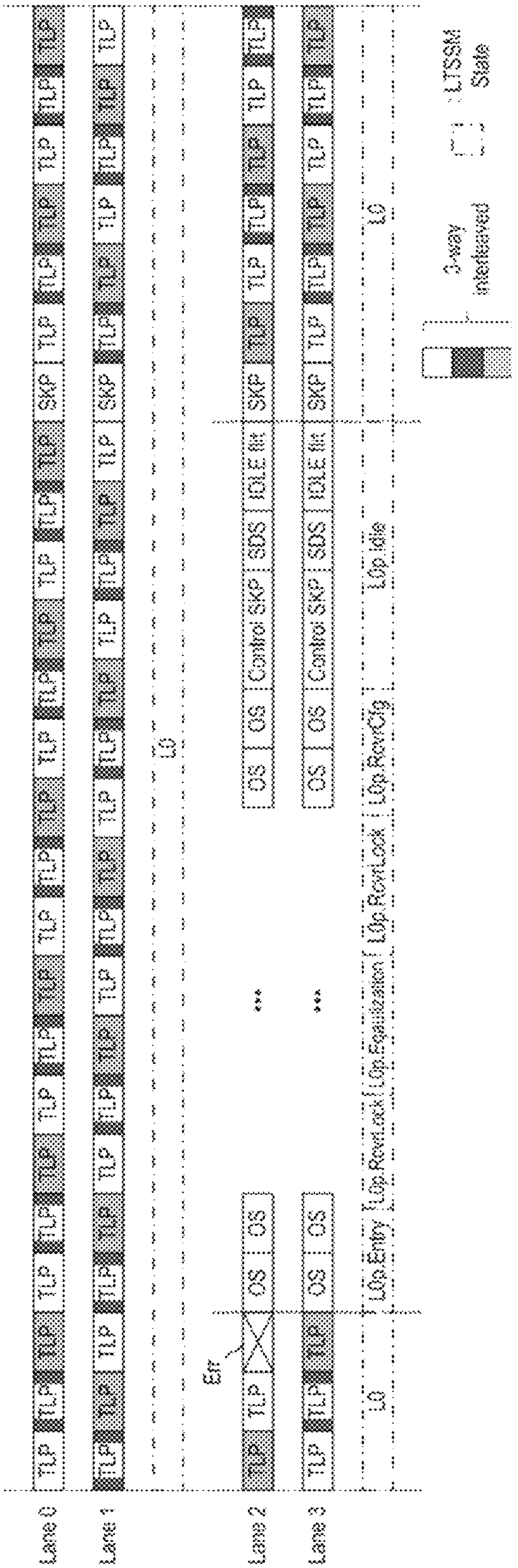
FIG. 13 is a diagram illustrating a data stream transmitted for each lane and LTSSM according to an example embodiment.

FIG. 13 is a diagram illustrating a data stream transmitted for each lane and LTSSM according to an example embodiment. Detailed descriptions of overlapping parts with FIG. 12 will be omitted to avoid duplication and for conciseness.

Referring to FIG. 13, in an example embodiment, when an x4 lane is set and operates in flit mode, an example may be provided in which, while each of the first to fourth lanes (Lane 0 to Lane 3) is transmitting a 3-way interleaved flit in the L0 state 400, an error Err or a plurality of errors are detected in a third lane (e.g., Lane 2).

Since the error Err was detected in the third lane (Lane 2), it may be difficult for the first and second devices 101 and 102 to operate at an x4 lane width, but the first and second devices 101 and 102 may operate at an x2 lane width including a first lane and a second lane (Lane 0 and Lane 1). Accordingly, the first and second devices 101 and 102 may continue to transmit flits while the first lane and the second lane, which are still operable, are maintained at an L0 state 400, and may transition to a first L0p sub-state 410 for the remaining third and fourth lanes. For example, the first and second devices 101 and 102 may operate at a lane width of x2.

The first and second devices 101 and 102 may transmit OS, required in each L0p sub-state, while transitioning to one of the first L0p sub-state 410 to the fourth L0p sub-states 425 according to the above-described embodiments for recovery lanes, for example, the third and fourth lanes (Lane 2 and Lane 3).

The first and second devices 101 and 102 may sequentially control SKP and SDS in the third lane and the fourth lane before transitioning to the L0 state 400 after transitioning to the fifth L0p sub-state 430 via the first L0p sub-state 410 and the fourth L0p sub-state 425. Then, the first and second devices 101 and 102 may transmit and receive idle flits and transition to the L0 state 400. Then, the first and second devices 101 and 102 may transmit SKP in response to a time point, at which the first lane and the second lane transmit SKP, to synchronize operation timings with the first lane and the second lane. Accordingly, the third and fourth lanes may return to the L0 state 400, and the link may again have a lane width of x4. As a result, all lanes may normally transmit flits in the L0 state 400.

While the embodiments related to the above-described data stream have been described with respect to the lane width of x4, example embodiments are not limited thereto. For example, example embodiments may be applied to all lane widths supported by the PCIe standard (x1, x2, x8, and x16), including the lane width of x4, and lane widths of more than x16. For example, when the link is set to xN and an error Err or a plurality of errors Err are detected in at least one lane among N lanes, the first and second devices 101 and 102 may transition to the L0p state 405 for recovery lanes including the lane in which the error Err is detected and may transmit flits while the remaining lanes are maintained in the L0 state 400. The first and second devices 101 and 102 may perform a recovery process while transmitting various OS through the first L0p sub-state 410 to the fifth L0p sub-state 430 for the recovery lane, and may transition back to the L0 state 400 for the recovery lane when the recovery process is completed.

Figure 14:
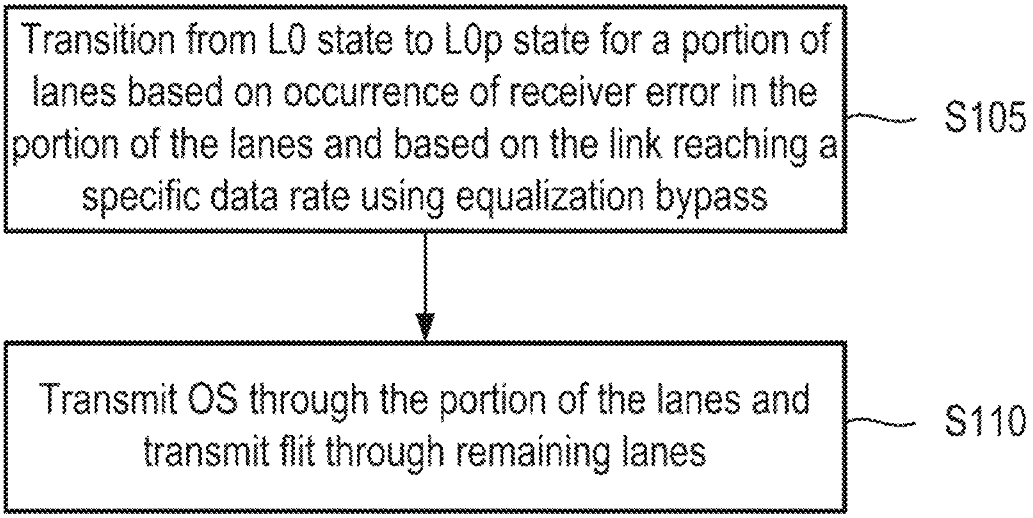
FIG. 14 is a flowchart illustrating a method of operating an apparatus according to an example embodiment.

FIG. 14 is a flowchart illustrating a method of operating an apparatus according to an example embodiment.

Referring to FIG. 14, in an example embodiment, in operation S105, the first and second devices 101 and 102 may transition from an L0 state 400, included in LTSSM, to an L0p state 405 for a portion of lanes based on a receiver error occurring in the portion of the lanes included in a link and the link reaching a specific data rate using equalization bypass. For example, the first and second devices 101 and 102 may first transition from the L0 state 400 to the first L0p sub-state 410.

In operation S110, the first and second devices 101 and 102 may transmit an OS through the portion of the lanes and transmit flits through the remaining lanes. The portion of the lanes may correspond to the above-described recovery lanes, and the remaining lanes may correspond to the above-described normal lanes. In this case, the portion of the lanes may interrupt the transmission of the flits and transmit the OS after transitioning to the L0p state 405, and the remaining lanes may transmit flits while being still maintained in the L0 state 400.

Figure 15:
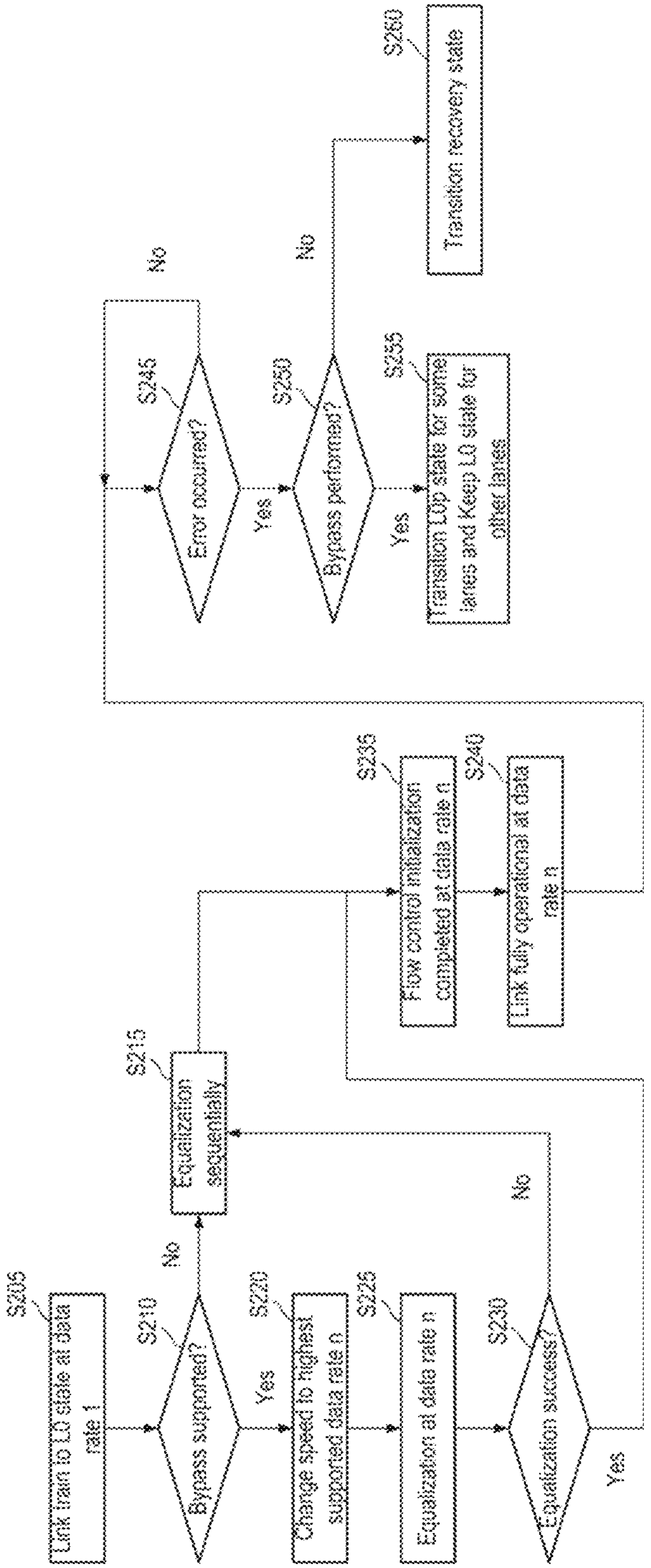
FIG. 15 is a flowchart illustrating equalization bypass operation method of an apparatus according to an example embodiment.

FIG. 15 is a flowchart illustrating equalization bypass operation method of an apparatus according to an example embodiment.

Referring to FIG. 15, in an example embodiment, in operation S205, the first and second devices 101 and 102 may train a link at a first data rate (data rate 1) for an L0 state 400. For example, the first data rate may be a lowest rate (2.5 GT/s), among data rates supported by the PCIe standard. In some example embodiments, the first and second devices 101 and 102 may advertise a highest data rate supported by each of the first and second devices 101 and 102. In some example embodiments, the first and second devices 101 and 102 may announce whether the first and second devices 101 and 102 support equalization bypass, respectively.

In operation S210, the first and second devices 101 and 102 may determine, respectively, whether the equalization bypass is supported. For example, the first device 101 may determine whether the second device 102 supports equalization bypass.

When at least one of the first and second devices 101 and 102 does not support the equalization bypass (operation S215, No), the first and second devices 101 and 102 may perform sequential equalization. In an example embodiment, when performing sequential equalization, the first and second devices 101 and 102 train a link at 2.5 GT/s, a rate supported in gen 1.0, and may then sequentially perform equalization for higher data rates (for example, 8.0 GT/s, 16 GT/s, 32 GT/s, and 64 GT/s).

When both the first and second devices 101 and 102 support equalization bypass (operation S210, Yes), the first and second devices 101 and 102 may change speed to a highest data rate (e.g., an n-th data rate(data rate n). For example, the first and second devices 101 and 102 may skip equalization of a data rate between a first data rate and the n-th data rate. For example, operation S220 may be performed when both of the first and second devices 101 and 102 notify that the first and second devices 101 and 102 support the equalization bypass. In operation S220, for example, the first and second devices 101 and 102 may transition to a recovery state at the first data rate, and may change the data rate to the n-th data rate in the recovery state. In operation S225, the first and second devices 101 and 102 may perform equalization at the n-th data rate (data rate n).

In operation S230, the first and second devices 101 and 102 may determine whether the equalization has been successfully performed through the equalization bypass. When the equalization fails (operation S230, No), the first and second devices 101 and 102 may perform sequential equalization in operation S215. When the equalization is successfully performed through the equalization bypass (S230, Yes) or is successfully perform through the sequential equalization in operation S215, the first and second devices 101 and 102 may complete flow control initialization at the n-th data rate (data rate n) for a normal operation in operation S235 and may operate a link at the n-th data rate (data rate n) in operation S240.

In operation S245, the first and second devices 101 and 102 may detect whether an error has occurred in the L0 state 400. When an error occurs (S245, Yes), the first and second devices 101 and 102 may determine whether bypass has been performed in operation S250. For example, the first and second devices 101 and 102 may determine whether a current data rate (for example, an n-th data rate) has been reached, based on the equalization bypass.

When the equalization bypass has been performed (operation S250, Yes), the first and second devices 101 and 102 may transition to the L0p state 405 for some lanes and may maintain the L0 state 400 for the remaining lanes in operation S255. When sequential equalization is performed rather than the equalization bypass (S250, No), the first and second devices 101 and 102 may transition to the recovery state in operation S260.

According to the above-described embodiments, when an error occurs and a current data rate is reached based on equalization bypass, all lanes may transition to the L0p state 405 for a recovery lane, rather than enter a recovery state, and a normal lane may be maintained in the L0 state 400, so that data communication may be maintained in some lanes. For example, even when equalization fails for the recovery lane after equalization bypass, the normal lane may still be maintained in the L0 state (400) to prevent a significant decrease in rate.

Figure 16:
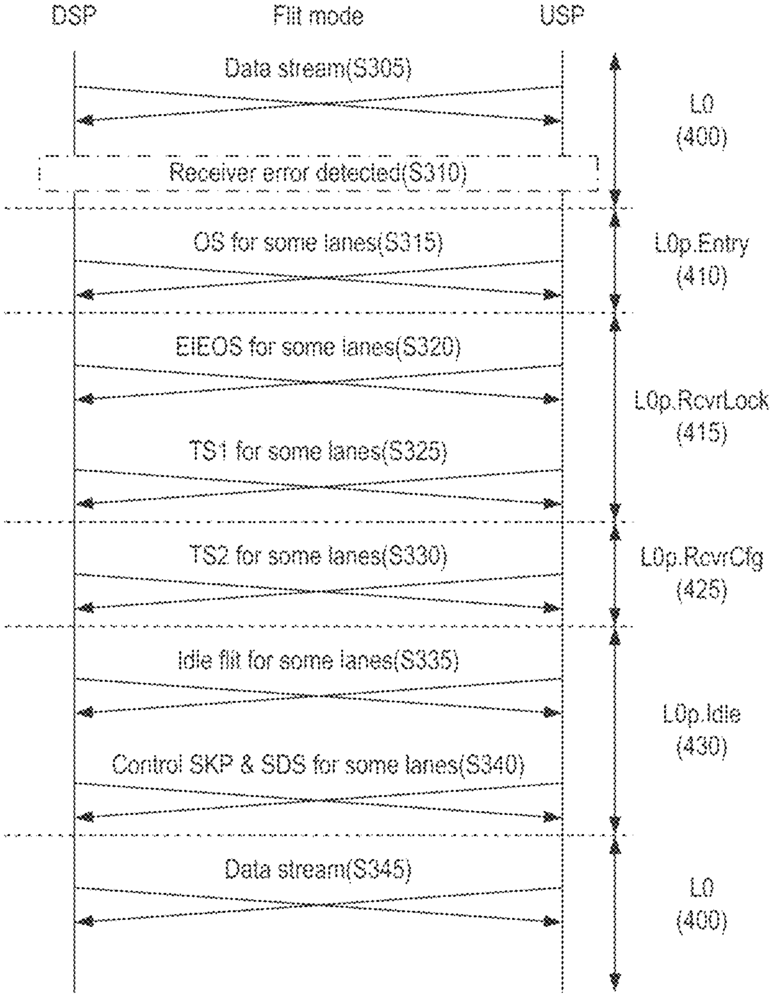
FIG. 16 is a diagram illustrating a method of transmitting packets between ports according to an example embodiment.

FIG. 16 is a diagram illustrating a method of transmitting packets between ports according to an example embodiment. In FIG. 16, an example is provided in which equalization has already been performed through the third L0p sub-state 420.

Referring to FIG. 16, in an example embodiment, in operation S305, DSP and USP may exchange data streams in flit mode. For example, when a lane width of x4 is set, a data stream may be the flit of FIG. 3.

While sending and receiving a data stream, a receiver error may be detected for some lanes in either one of a DSP port and a USP port, in operation S310. When a receiver error is detected, DSP and USP may transition from an L0 state 400 to a first L0p sub-state 410. In operation S315, a single port in which a receiver error has been detected may interrupt transmission of flits for some lanes and start transmitting OS, and a single remaining port that has received the OS may also interrupt transmission of flits and start transmitting the OS.

When the transmission of flits is interrupted, the DSP and the USP may transition to a second L0p sub-state 415, and may exchange EIEOS for block alignment for some lanes in operation S320. As described above, when equalization history is already present, the DSP and the USP may exchange TS1 for some lanes in operation S325.

Then, the DSP and the USP may transition to a fourth L0p sub-state 425, and may exchange TS2 for some lanes in operation S330.

Then, the DSP and the USP may transition to a fifth L0p sub-state 430 and may exchange idle flits for some lanes in operation S335. When the transition to the L0 state 400 is determined, the DSP and the USP may sequentially exchange control SKP and SDS for some lanes in operation S340. Finally, the DPS and the USP may transition back to the L0 state 400, and may exchange data streams in operation S345.

In the above-described embodiments, in operations S315 to operation S340, the DSP and the USP may still exchange data streams, for example, flits in the L0 state 400 S340 for the remaining lanes except for the lanes (i.e., some lanes) in which the OS is transmitted and received after a receiver error occurs.

Figure 17:
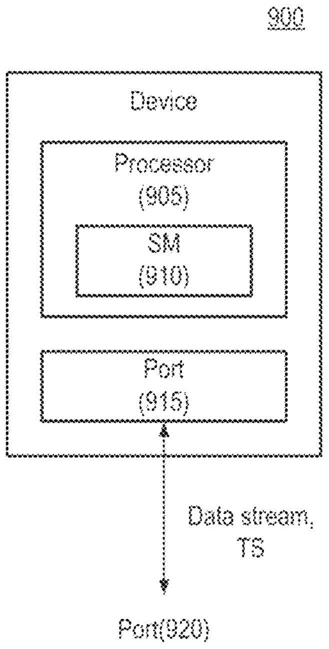
FIG. 17 is a diagram illustrating an apparatus according to an example embodiment.

FIG. 17 is a diagram illustrating an apparatus according to an example embodiment.

Referring to FIG. 17, an apparatus 900 according to an example embodiment may include a processor 905 and a port 915. According to various embodiments, the apparatus 900 may be a host such as a main processor or a central processor, a root complex, a switch, an endpoint, or other components supporting communication with the host. That is, in some example embodiments, the apparatus 900 may correspond to one of the first and second devices 101 and 102 described above.

The processor 905 may control the overall operation of the apparatus 900. In an example embodiment, the processor 905 may include a state machine 910 and control transition operations between a plurality of states included in the state machine 910. The processor 905 may control a link based on the state machine 910 and perform, for example, a link training process and an error recovery process between the port 915 and another port 920 of another device. For example, in some example embodiments, the another device may correspond to the other one of the first and second devices 101 and 102 described above.

The port 915 may be connected to the another port 920 through a link. In some example embodiments, the link may correspond to the link 103 described above. The port 915 may be used to communicate with the another port 920 using an interconnect protocol. The port 915 may be connected to the link to support communication between the apparatus 900 and the another device, and may be configured to transmit flits in flit mode.

The apparatus 900 may transmit and receive a training sequence TS and a data stream to and from the another port 920 through the port 915.

The apparatus 900 may perform an error recovery process through the state machine 910 based on the above-described various embodiments. In an example embodiment, the state machine 910 may include an L0p state 405 including a first L0p sub-state 410 to a fifth L0p sub-state 430. The processor 905 may transition from an L0 state 400 to the L0p state 405 for some lanes based on a receiver error occurring in one or more lanes and a link reaching a specific data rate using equalization bypass. After transitioning to the L0p state 405, the port 915 may transmit OS through some lanes and transmit flits through the remaining lanes. The processor 905 may control the port 915 to transmit a signal to be transmitted in each sub-state while transitioning to various substates included in the Loop state 405.

Figure 18:
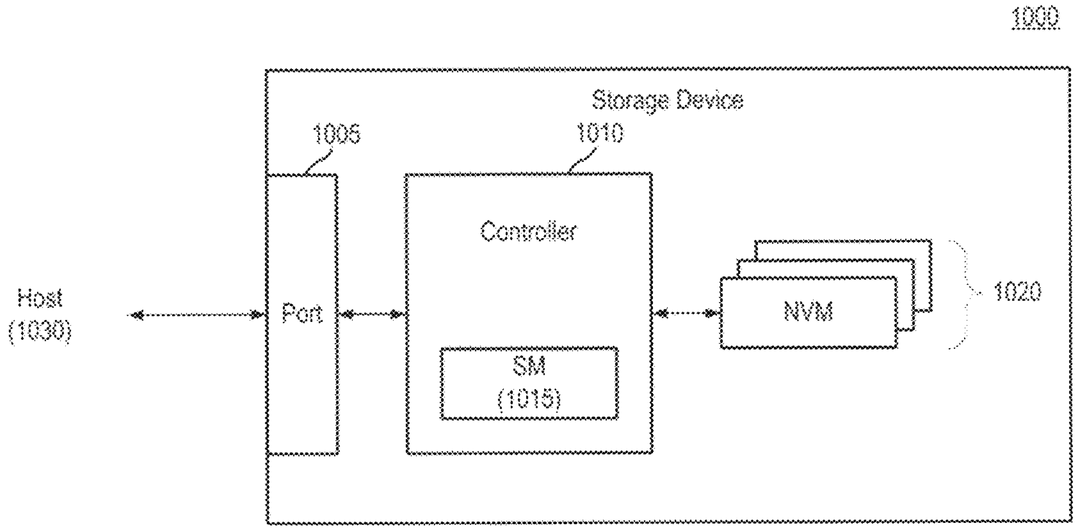
FIG. 18 is a diagram illustrating a storage device according to an example embodiment.

FIG. 18 is a diagram illustrating a storage device according to an example embodiment.

Referring to FIG. 18, a storage device 1000 according to an example embodiment may include a port 1005, a controller 1010, and a nonvolatile memory NVM 1020. The storage device 1000 may be connected to a host 1030.

In an example embodiment, the storage device 1000 may be a solid-state drive (SSD), universal flash storage (UFS), or an embedded multi-media controller (eMMC). In some example embodiments, the storage device 1000 may be a secure digital (SD) card, a micro SD card, a memory stick, a chip card, a universal serial bus (USB) card, or a smart card, a compact flash (CF) card, or the like, but example embodiments are not limited to thereto.

In an example embodiment, the storage device 1000 may be implemented in any form factor such as 3.5 inch, 2.5 inch, 1.8 inch, M.2, U.2, U.3, enterprise and data center SSD form factor (EDSFF), new form factor 1 (NF1), and/or the like.

In an example embodiment, the storage device 1000 may be implemented with SATA (Small Computer System Interface), SCSI (Small Computer System Interface), SAS (Serial Attached SCSI), and/or similar interfaces; and one or more of the following protocols: PCI, PCIe, NVMe (Nonvolatile Memory Express), NVMe-oF (NVMe-over-Fabrics), Ethernet, InfiniBand, Fiber Channel, and/or similar protocols.

The controller 1010 may be connected to the nonvolatile memory 1020 and the port 1005 to control the overall operation of the storage device 1000 including the nonvolatile memory 1020. The controller 1010 may perform operations according to the above-described various embodiments.

In an example embodiment, the controller 1010 may control a link based on a state machine 1215. The controller 1010 may control the port 1005 to perform an error recovery process through the state machine 1015. In an example embodiment, the state machine 1015 may include an L0p state 405 including a first L0p sub-state 410 to a fifth L0p sub-state 430. The controller 1010 may transition from the L0 state 400 to the L0p state 405 for a portion of lanes of a plurality of lanes based on a receiver error occurring in one or more of the portion of the lanes and the link reaching a specific data rate using equalization bypass. After transitioning to the L0p state 405, the port 1005 may transmit OS through the portion of the lanes and transmit flits through the remaining lanes of the plurality of lanes. The controller 1010 may control the port 1005 to transmit a signal to be transmitted in each sub-state while transitioning to various sub-states included in the L0p state 405.

The nonvolatile memory NVM 1020 may be controlled by the controller 1010. The nonvolatile memory 1020 may store data transmitted from the host 1030, data generated by the storage device 1000, or various other data written by the controller 1010. In an example embodiment, the nonvolatile memory 1020 may include any nonvolatile memory such as a NAND flash memory, a phase change random access Memory (PRAM), a resistance random access memory (RRAM), a nano floating gate memory (NFGM), a polymer random access memory (PoRAM), and a magnetic random access memory (MRAM), or a ferroelectric random access memory (FRAM), but example embodiments are not limited thereto.

As set forth above, according to example embodiments, an apparatus for error recovery and a method of operating the same may be provided.

While various example embodiments have been shown and described above, it will be apparent to those skilled in the art that modifications and variations may be made to the example embodiments without departing from the scope of the present disclosure as defined by the appended claims.

What is claimed is:

1. An apparatus comprising:

a port connected to a link comprising a plurality of lanes to support communication between the apparatus and another device and configured to transmit a flit in a flit mode; and a processor configured to control the link based on a link training and status state machine (LTSSM), wherein:

the processor is configured to transition from an L0 state to an L0p state, included in the LTSSM, for a portion of the plurality of lanes based on a receiver error occurring in the portion of the plurality of lanes and based on the link reaching a specific data rate using an equalization bypass, and the port is configured to, after transitioning to the L0p state, transmit an ordered set (OS) through the portion of the plurality of lanes and transmit the flit through remaining lanes of the plurality of lanes.

2. The apparatus of claim 1, wherein the equalization bypass skips equalization of a plurality of data rates lower than the specific data rate.

3. The apparatus of claim 1, wherein the L0p state comprises a first L0p sub-state, a second L0p sub-state, a third L0p sub-state, a fourth L0p sub-state, and a fifth L0p sub-state.

4. The apparatus of claim 3, wherein the processor is configured to:

control the port to interrupt transmission of the flit for the portion of the plurality of lanes based on transitioning to the first L0p sub-state for the portion of the plurality of lanes; and transition to the second L0p sub-state based on interrupting the transmission of the flit for the portion of the plurality of lanes.

5. The apparatus of claim 3, wherein the processor is configured to control the port to transmit an electrical idle exit ordered set (EIEOS) for the portion of the plurality of lanes based on transitioning to the second L0p sub-state for the portion of the plurality of lanes.

6. The apparatus of claim 3, wherein the processor is configured to transition from the second L0p sub-state to the third L0p sub-state for the portion of the plurality of lanes based on performing equalization after transitioning to the L0p state.

7. The apparatus of claim 3, wherein the processor is configured to:

perform equalization based on transitioning to the third L0p sub-state for the portion of the plurality of lanes; and transition from the third L0p sub-state to the second L0p sub-state for the portion of the plurality of lanes based on successfully performing the equalization.

8. The apparatus of claim 7, wherein the processor is configured to transition from the third L0p sub-state to the second L0p sub-state for the portion of the plurality of lanes based on a timeout occurring during the equalization, and to maintain a data rate in the transition.

9. The apparatus of claim 3, wherein the processor is configured to transition from the second L0p sub-state to the fourth L0p sub-state for the portion of the plurality of lanes based on performing at least one equalization and based on receiving a specific number of training sequences after transitioning to the L0p state.

10. The apparatus of claim 3, wherein the processor is configured to:

control the port to transmit a training sequence for the portion of the plurality of lanes based on transitioning to the fourth L0p sub-state for the portion of the plurality of lanes; and transition from the fourth L0p sub-state to the fifth L0p sub-state for the portion of the plurality of lanes based on receiving a specific number of training sequences.

11. The apparatus of claim 3, wherein the processor is configured to control the port to sequentially transmit a control skip (SKP) OS and an SDS OS based on transitioning to the fifth L0p sub-state for the portion of the plurality of lanes.

12. The apparatus of claim 3, wherein the processor is configured to transition from the fifth L0p sub-state to the L0 state based on receiving N1 idle flits for the portion of the plurality of lanes and transmitting N2 idle flits, N1 and N2 being positive integers.

13. The apparatus of claim 5, wherein the processor is configured to transition from the second L0p sub-state to an electrical idle (EI) state for the portion of the plurality of lanes based on not obtaining block alignment from the EIEOS.

14. The apparatus of claim 8, wherein the processor is configured to transition from the second L0p sub-state to an electrical idle (EI) state based on transitioning to the second L0p sub-state and based on the timeout.

15. A method comprising:

transitioning from an L0 state to an L0p state, included in a link training and status state machine (LTSSM), for a portion of a plurality of lanes included in a link based on a receiver error occurring in the portion of the plurality of lanes and based on the link reaching a specific data rate using an equalization bypass; and transmitting an ordered set (OS) through the portion of the plurality of lanes and transmitting a flit through remaining lanes of the plurality of lanes.

16. The method of claim 15, wherein the L0p state comprises a first L0p sub-state, a second L0p sub-state, a third L0p sub-state, a fourth L0p sub-state, and a fifth L0p sub-state, and wherein the method further comprises:

interrupting transmission of a flit in the first L0p sub-state for the portion of the plurality of lanes; and transitioning to the second L0p sub-state, based on interrupting the transmission of the flit for the portion of the plurality of lanes.

17. The method of claim 16, further comprising:

transmitting an electrical idle exit ordered set (EIEOS) in the second L0p sub-state for the portion of the plurality of lanes; and transitioning from the second L0p sub-state to an electrical idle (EI) state for the portion of the plurality of lanes based on not obtaining block alignment from the EIEOS.

18. The method of claim 16, further comprising:

determining whether an equalization history is present after transitioning to the L0p state; and transitioning to the third L0p sub-state, based on the equalization history being absent.

19. The method of claim 18, further comprising:

performing equalization based on transitioning to the third L0p sub-state for the portion of the plurality of lanes;

transitioning from the third L0p sub-state to the second L0p sub-state for the portion of the plurality of lanes based on a timeout occurring during the equalization, and maintaining a data rate in the transition; and transitioning from the second L0p sub-state to an electrical idle (EI) state for the portion of the plurality of lanes.

20. A storage device comprising:

a nonvolatile memory;

a port connected to a link comprising a plurality of lanes to support communication between the storage device and another device and configured to transmit a flit in a flit mode; and a controller configured to control the link based on a link training and status state machine (LTSSM), wherein:

the controller is configured to transition the storage device from an L0 state to an L0p state, included in the LTSSM, for a portion of the plurality of lanes based on a receiver error occurring in the plurality of lanes and based on the link reaching a specific data rate using equalization bypass, and the port is configured to, after transitioning to the L0p state, transmit an ordered set (OS) through the portion of the plurality of lanes and transmit the flit through remaining lanes of the plurality of lanes.

* * * * *